(12) United States Patent  (10) Patent No.: US 8,533,604 B1
Parenti et al.  (45) Date of Patent: Sep. 10, 2013

(54) TECHNIQUES FOR USER INTERFACE SELECTION

(75) Inventors: Mark Parenti, Milford, NH (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 763 days.

(21) Appl. No.: 12/215,150

(22) Filed: Jun. 25, 2008

(51) Int. Cl.
*G06F 3/00* (2006.01)
*G06F 3/048* (2006.01)

(52) U.S. Cl.
USPC ............ 715/743; 715/707; 715/741; 715/777

(58) Field of Classification Search
USPC .................................. 715/743, 707, 741, 777
See application file for complete search history.

(56) References Cited

U.S. PATENT DOCUMENTS

| | | | | |
|---|---|---|---|---|
| 6,826,727 | B1 * | 11/2004 | Mohr et al. ................... | 715/235 |
| 7,197,125 | B1 * | 3/2007 | Prasad et al. ............. | 379/201.02 |
| 7,237,119 | B2 * | 6/2007 | Clark et al. ................... | 713/182 |
| 7,299,492 | B2 * | 11/2007 | Thrash et al. ..................... | 726/5 |
| 7,620,894 | B1 * | 11/2009 | Kahn ............................. | 715/707 |
| 2004/0268125 | A1 * | 12/2004 | Clark et al. .................... | 713/166 |
| 2006/0218635 | A1 * | 9/2006 | Kramer et al. .................. | 726/22 |
| 2007/0073551 | A1 * | 3/2007 | Williams et al. .................. | 705/1 |
| 2007/0118804 | A1 * | 5/2007 | Raciborski et al. ........... | 715/745 |
| 2008/0005686 | A1 * | 1/2008 | Singh ............................ | 715/764 |

OTHER PUBLICATIONS

U.S. Appl. No. 11/824,578, filed Jun. 29, 2007, Uday K. Gupta, et al.

* cited by examiner

*Primary Examiner* — David Phantana Angkool
(74) *Attorney, Agent, or Firm* — Muirhead and Saturnelli, LLC

(57) ABSTRACT

Described are techniques for user interface selection. A plurality of user interface sets is provided. Each of the plurality of user interface sets includes a plurality of user interfaces corresponding to a plurality of user levels of interaction. Each of the plurality of user levels of interaction is associated with a different level of abstraction with respect to processing performed in the data storage system for implementing a request. First user information associated with the user is provided. The first user information identifies one of said plurality of user levels for at least one of the plurality of user interface sets. A user interface is selected for display in connection with interactions with the user in accordance with the first user information. The selected user interface is displayed.

19 Claims, 18 Drawing Sheets

TECHNIQUES FOR USER INTERFACE SELECTION

BACKGROUND

1. Technical Field

This application generally relates to computer systems, and more particularly to techniques used in connection with user interfaces.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration, a customer may not have the appropriate level of sophistication and knowledge needed. Also, the particular level of knowledge may vary with each user. Additionally, a single user's knowledge level may vary for different applications and/or tasks that the single user may perform.

Thus, it may be desirable to utilize a flexible technique for user interface management and selection providing a level of user interaction which assists customers in connection with performing requests for different tasks. It may be desirable that the technique provide for selection of a user interface in accordance with the particular user as well as the varying knowledge levels of a single user when performing different tasks.

SUMMARY OF THE INVENTION

In accordance with one aspect of the invention is a computer-implemented method for user interface selection for a user comprising: providing a plurality of user interface sets, wherein each of said plurality of user interface sets includes a plurality of user interfaces corresponding to a plurality of user levels of interaction, each of said plurality of user levels of interaction being associated with a different level of abstraction with respect to processing performed in the data storage system for implementing a request; providing first user information associated with the user, the first user information identifying one of said plurality of user levels for at least one of the plurality of user interface sets; selecting a user interface for display in connection with interactions with the user in accordance with the first user information; and displaying, the user interface. At least one of the plurality of user interface sets may be associated with implementing a request in connection with one or more parameters indicating a particular task performed in connection with an application. The one or more parameters may indicate performing a data storage provisioning request for an application. A first of the plurality of user interface sets may be associated with performing the data storage provisioning request for the application, and a second different one of the plurality of user interface sets may be associated with performing a different type of request for the application. The plurality of user interface sets may include a first user interface set, the first user interface set may include a first plurality of user interfaces for use in connection with obtaining information of a data storage request, and the first user information may include a first identifier identifying a first user level and an associated one of the first plurality of user interfaces. The first identifier may include a user interface extension indicator indicating that the user may select to interact at one or more other levels included in a range of levels from said first user level to a maximum user level, each of said levels in the range being associated with one of the user interfaces in the first user interface set. The associated one of the first plurality of user interfaces may be updated in accordance with at least one of a manual selection and an automatic update using one or more criteria. The one or more criteria may include successful implementation of a threshold number of requests at a level in the range, and if the threshold number of requests at said level is performed, then said first identifier may be updated to identify said level and a corresponding user interface for said level is initially displayed in connection with a subsequent session for said user.

In accordance with another aspect of the invention is a computer-implemented method for user interface selection for a user comprising: providing a plurality of user interface sets, wherein each of said plurality of user interface sets includes a plurality of user interfaces corresponding to a plurality of user levels of interaction, each of said plurality of user levels of interaction being associated with a different level of abstraction with respect to processing performed in a data storage system for implementing a request; providing a table of first user information associated with the user, the first user information including a starting level identifier for each of said plurality of user interface sets, said starting level identifier including a first identifier identifying one of the user interfaces from said each user interface set and an optional extension indicator wherein, if said optional extension indicator is included in said starting level identifier, said optional extension indicator indicates that the user may select to interact at a different user level and associated user interface than as indicated by the first identifier; selecting, from the plurality of user interface sets, a selected user interface set for obtaining information used to implement a request for a task associated with said selected user interface set; selecting, in accordance with the selected user interface set, an entry in the table; selecting, from the selected user interface set, a first user interface in accordance with the first identifier included in the entry for the selected user interface set; and displaying the first user interface. The entry in the table may include said starting level identifier, said starting level identifier including said first identifier and the extension indicator. The extension indicator may indicate that the user may interact at a selected one of a plurality of user levels ranging from a first level corresponding to said first identifier and a maximum level, each of said plurality of user levels including a corresponding user interface in the selected user interface set. The method may also include displaying a selectable tab for each of said plurality of user levels ranging from the first level to the maximum level. The first identifier may be automatically updated in accordance with data collected for activity of said user. At least one of the plurality of user interface sets may be associated with performing data storage provisioning for an application storing data on the data storage system. updating of the first identifier may be performed in accordance with an enablement indicator, wherein when said enablement indicator is enabled, processing is performed to determine whether to update the first identifier in accordance with data collected for activity of the user, and if said enablement indicator is not enabled, said processing is not performed. Permission information for the user may be used to determine whether the user is allowed to modify data displayed in the first user interface and whether the user is allowed to implement a request using the first interface.

In accordance with another aspect of the invention is a computer readable medium comprising executable code stored thereon for user interface selection for a user, the computer readable medium comprising executable code for: providing a plurality of user interface sets, wherein each of said plurality of user interface sets includes a plurality of user interfaces corresponding to a plurality of user levels of interaction, each of said plurality of user levels of interaction being associated with a different level of abstraction with respect to processing performed in a data storage system for implementing a request; providing a table of first user information associated with the user, the first user information including a starting level identifier for each of said plurality of user interface sets, said starting level identifier including a first identifier identifying one of the user interfaces from said each user interface set and an optional extension indicator wherein, if said optional extension indicator is included in said starting level identifier, said optional extension indicator indicates that the user may select to interact at a different user level and associated user interface than as indicated by the first identifier; selecting, from the plurality of user interface sets, a selected user interface set for obtaining information used to implement a request for a task associated with said selected user interface set; selecting, in accordance with the selected user interface set, an entry in the table; selecting, from the selected user interface set, a first user interface in accordance with the first identifier included in the entry for the selected user interface set; and displaying the first user interface. The entry in the table may include said starting level identifier. The starting level identifier may include said first identifier and the extension indicator, wherein the extension indicator indicates that the user may interact at a selected one of a plurality of user levels ranging from a first level corresponding to said first identifier and a maximum level, each of said plurality of user levels including a corresponding user interface in the selected user interface set. The computer readable medium may also include executable code for displaying a selectable tab for each of said plurality of user levels ranging from the first level to the maximum level. The first identifier may be automatically updated in accordance with data collected for activity of said user. Updating of the first identifier may be performed in accordance with an enablement indicator so that when said enablement indicator is enabled, processing is performed to determine whether to update the first identifier in accordance with data collected for activity of the user, and if said enablement indicator is not enabled, said processing is not performed. At least one of the plurality of user interface sets may be associated with performing data storage provisioning for an application storing data on the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
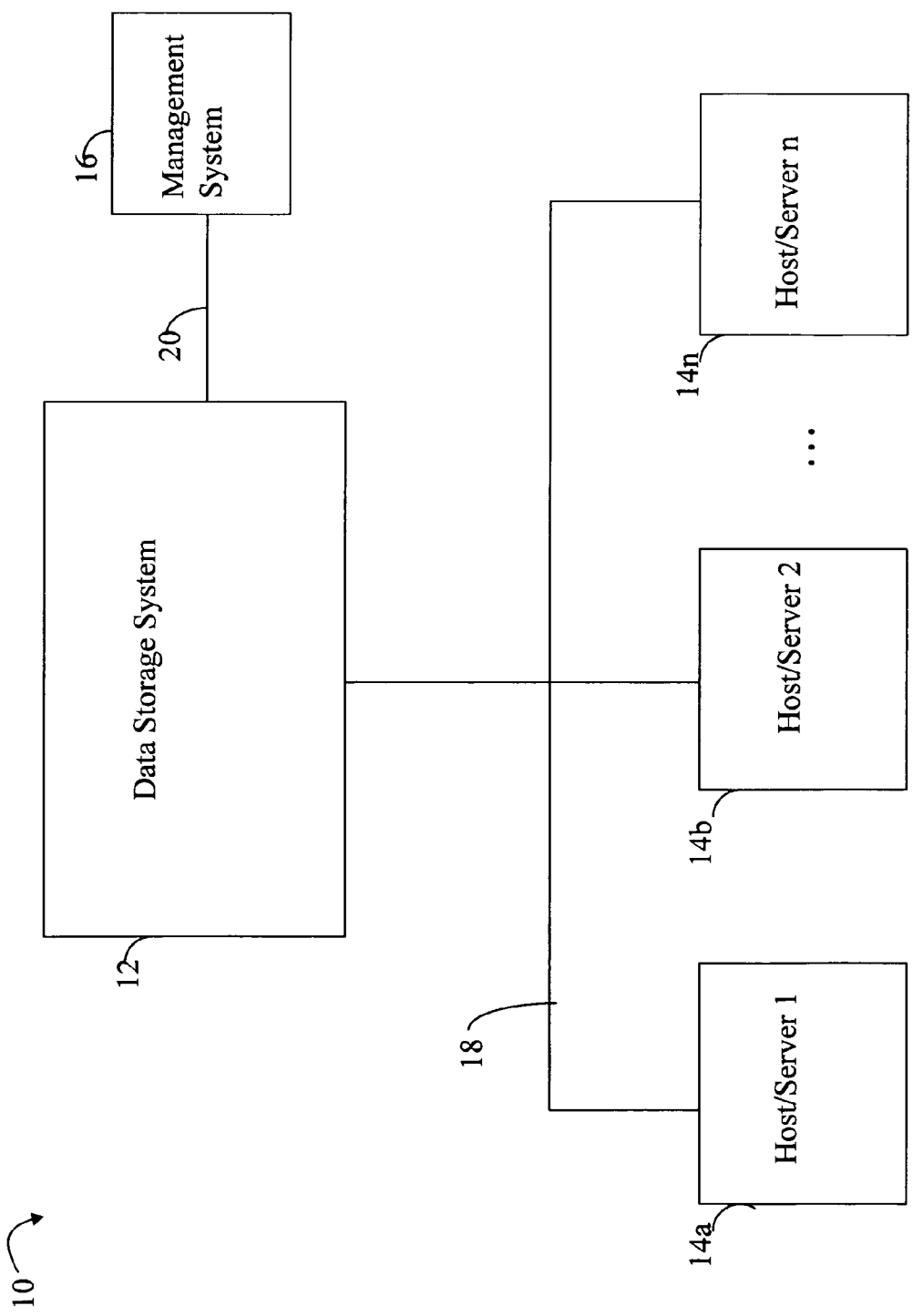
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be a data storage array or an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems, such as a data storage array, may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
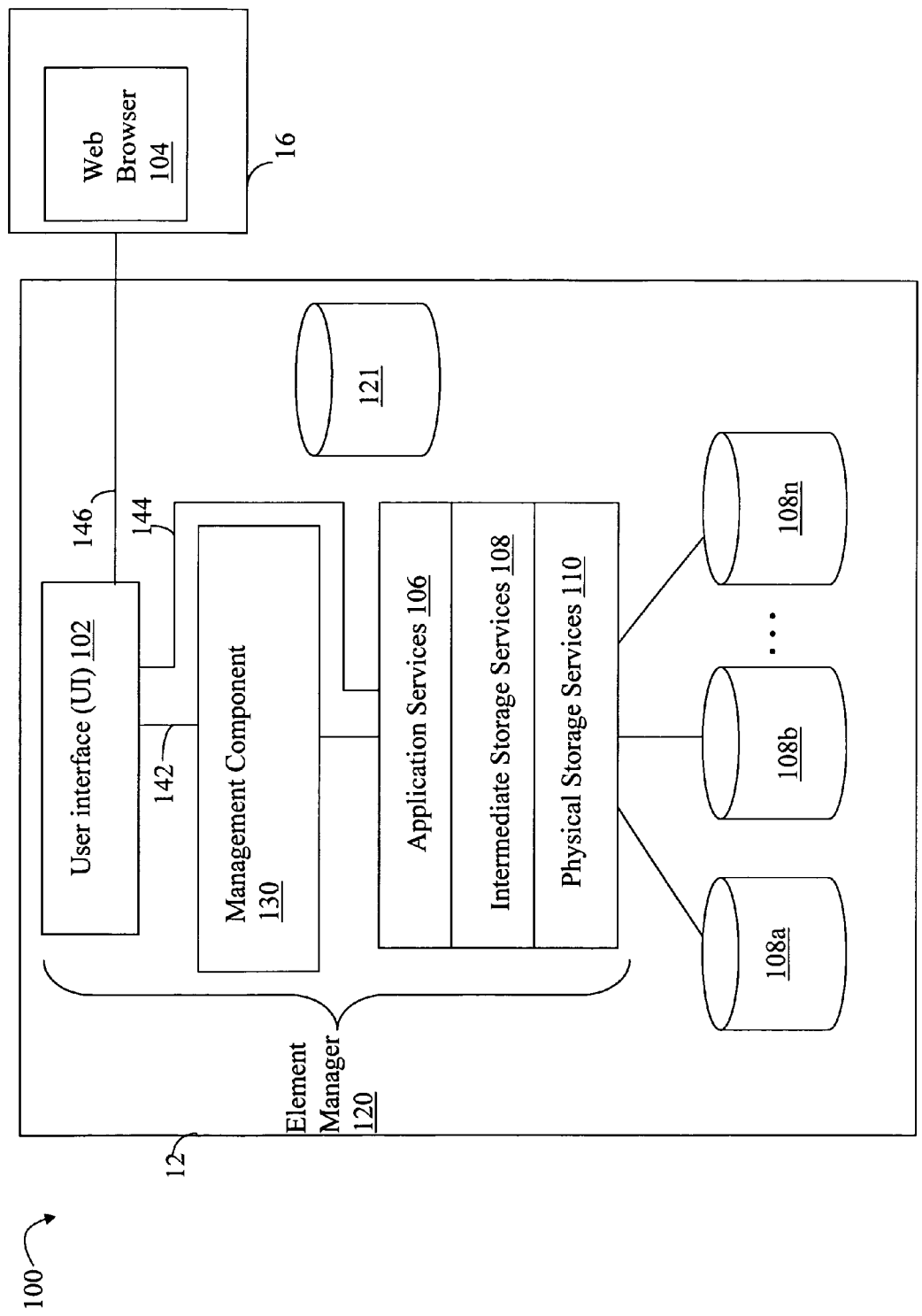
FIG. 2 is an example of components that may be included on the data storage system for use in performing the techniques herein.

Referring to FIG. 2, shown is an example of components that may be included on the data storage system 12 and the management system 16. The management system 16 may include a web browser 104 which is used when communicating with the element manager (EM) 120 of the data storage system 12. The EM 120 may be used to perform operations in connection with management, configuration, monitoring, and the like, of the data storage system. For example, the EM 120 may be used to provision storage used by any one or more different applications such as an email application, a database application, and file server, and the like. As described herein, the EM 120 may also be used to facilitate interactions with environments and locations external to the data storage system 12 and management system 16, such as other computer network locations. In other words, the EM 120 may be used to facilitate communications with other locations and environments external with respect to the data storage system environment in which the data storage system environment may include, for example, one or more data storage systems 12, the management system 16, a SAN, and the like.

The EM 120 includes a user interface (UI) 102, a management component 130, and one or more layers or levels of services, such as 106, 108 and 110, in connection with implementing a data storage request such as a data storage configuration or data storage provisioning request.

The user interface (UI) 102 may provide for one or more different types of user interfaces and associated data. For example, the UI 102 may provide support for a graphical user interface (GUI), command line interface (CLI), and the like, to support interactions between the data storage system 12 and the hosts 14a-14n of FIG. 1. The UI 102 may interact with other components on the data storage system in connection with communicating with a user. For example, the UI 102 may provide UI data (e.g., content or data used to populate the UI menus), and UI presentation or structure information (e.g., command organization or particular hierarchical menu structure) to another component such as the web browser 104 in connection with interacting with the user. This is described in more detail in following paragraphs for use in connection with the techniques herein where the UI may be customized and adapted for use with each particular user, different levels of knowledge and expertise, and/or different desired levels of automation that may be performed in connection with implementing a data storage operation request in accordance with best practices. Information for each particular user may be stored in a location represented by element 121. As will be described in more detail below, element 121 may include one or more types of user information such as, for example, user preferences and information generally usable in connection with the techniques herein to provide one or more customized user interfaces for each user of the data storage system 12.

The management component 130 may be used in connection with facilitating communications between the UI 102 and the different service layers 106, 108 and 110 when performing element management operations. In one embodiment, element management operations may be characterized as those involving interactions with environments and locations internal and/or external to the data storage system environment. Such external environments and locations may include, for example, other network locations and websites as described elsewhere herein. The management component 130 may facilitate a two-way communication flow of information to and/or from the external environments.

In the example 100, the component 130 is represented as a single logical component. However, an embodiment may integrate the operations and functionality of the component 130 in the UI 102 and/or other components included in the EM 120.

It should be noted that there are two paths 142 and 144 illustrated in FIG. 2. The path 142 may be used in connection with those operations involving interactions with environments external to the data storage system. The path 144 may be used when performing operations that do not involve such interactions with environments external to the data storage system 12 and management system 16. For example, the path 144 may be used in connection with performing a data storage configuration request issued by a user from the management system 16. The path 142 may be utilized if an operation or condition occurs involving the EM component 130 such as when the user requests connection to a website on the Internet for additional information and assistance with respect to an error that occurred as a result of the data storage configuration request.

In the example 100, the EM 120 may include application services 106, intermediate or generic storage services 108, and physical storage services 110. In one embodiment, the user may interact with the UI communicating directly with any one of the different services 106, 108 and 110. In other words, a user may communicate directly with layer 106, 108 or 110. If a user provides an input request and/or data by directly communicating with one of the upper service layers, such as 106, the user request and/or data may be mapped to one or more lower service requests, such as by services of 106 communicating with services of 108 and/or 110 to implement the original input request. By connecting to the different service layers 106, 108 and 110, the UI may provide the user with exposure to different levels of abstraction in connection with performing data storage system management tasks. In one embodiment as described in more detail below, the different service layers may be in accordance with different levels of proficiency and knowledge with respect to performing data storage system management tasks for different applications.

The application services 106 may have an application-specific focus and provide a level of abstraction customized for an application such as, for example, a particular email application, law office application or medical office application, as well as a class of related applications, such as multiple email applications. The application services layer 106 may map the user provided inputs for use by the intermediate storage services 108. When a user interacts with the application services 106 for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application services 106 may use one set of rules or mappings for each application to implement the application specific best practices for the user level. A first set of rules for the medical office application may be used to map the user input parameters using medical office terminology to parameters for the appropriate API calls for other services included in 108 and/or 110. A second set of rules for the law office application may be used to map the user input parameters using law office terminology to parameters for the appropriate API calls for other services 108 and/or 110. The user connecting to the data storage system at the application services 106 may be provided with a user interface customized for the selected level and application to perform a requested data storage configuration.

The intermediate storage services 108 may be an intermediate level. The application services 106 may communicate with the intermediate storage services 108 when implementing a request for data storage configuration. In one embodiment, a user connecting to the intermediate storage services 108 may be provided with a generic level of interaction which may not be tailored for the particular application. In other words, the same language and user interface may be presented to a user for multiple applications such as the medical application or law office application. As a variation to the foregoing, the intermediate storage services 108 may be customized for each application and provide for a more detailed level of exposure that varies per application.

The physical storage services 110 provide the most detailed or greatest level of exposure of the underlying data storage system. The physical storage services 110 may be customized for the particular storage vendor and associated options. The user interface for a user connected at to the physical storage services may include menu options and terms particular to the underlying storage vendor and the more knowledgeable user. For example, the user may specify particular devices, RAID levels and techniques, file types, SCSI and iSCSI terminology, and the like.

As an example in connection with a user making a data storage configuration request and communicating with the application services 106, the user may input data in connection with the request in an application specific context. For example, a user may make a data storage configuration request to configure or provision data storage for a file system or email application. The data input by the user may be in the context of the particular application (e.g., a number of mailboxes, size of mailbox, storage group, and the like). The application-specific data received by the application services 106 may be mapped to one or more application-neutral or generic requests to the intermediate storage services 108. The intermediate storage services 108 may then make one or more calls to the physical storage services 110 to implement requests in the context of the physical storage devices 108a-108n, for example, for the particular data storage vendor and underlying hardware.

Software executed on the data storage system may provide for implementation of best practices for data storage configuration and data services in accordance with each particular application whose data is hosted on the data storage system. Such software may be included in the different service layers, such as 106, 108 and 110, of the EM and are described in more detail below and also in U.S. patent application Ser. No. 11/824,578, filed Jun. 29, 2007, APPLICATION AWARE STORAGE, which is incorporated by reference herein. In such an embodiment using the different service layers, such as 106, 108 and 110 having an application-specific focus with each layer providing a different level of abstraction customized for each application, the UI may provide a user with different levels of exposure to information and requests when performing data storage system configuration tasks.

It will be appreciated by those skilled in the art that an embodiment may include different service layers in connection with performing the techniques described herein.

It should be noted that the example 100 is one possible embodiment of the components used in connection with the techniques herein. As illustrated in FIG. 2, the EM 120 is included in the data storage system. In another embodiment using the techniques herein, the EM 120 may be installed and execute on a host or other component connected to the data storage system. In yet another embodiment portions of the EM 120, such as the UI 102 and/or one or more of the services 106, 108, 110 may be installed and execute on a host or other component connected to the data storage system.

Figure 3:
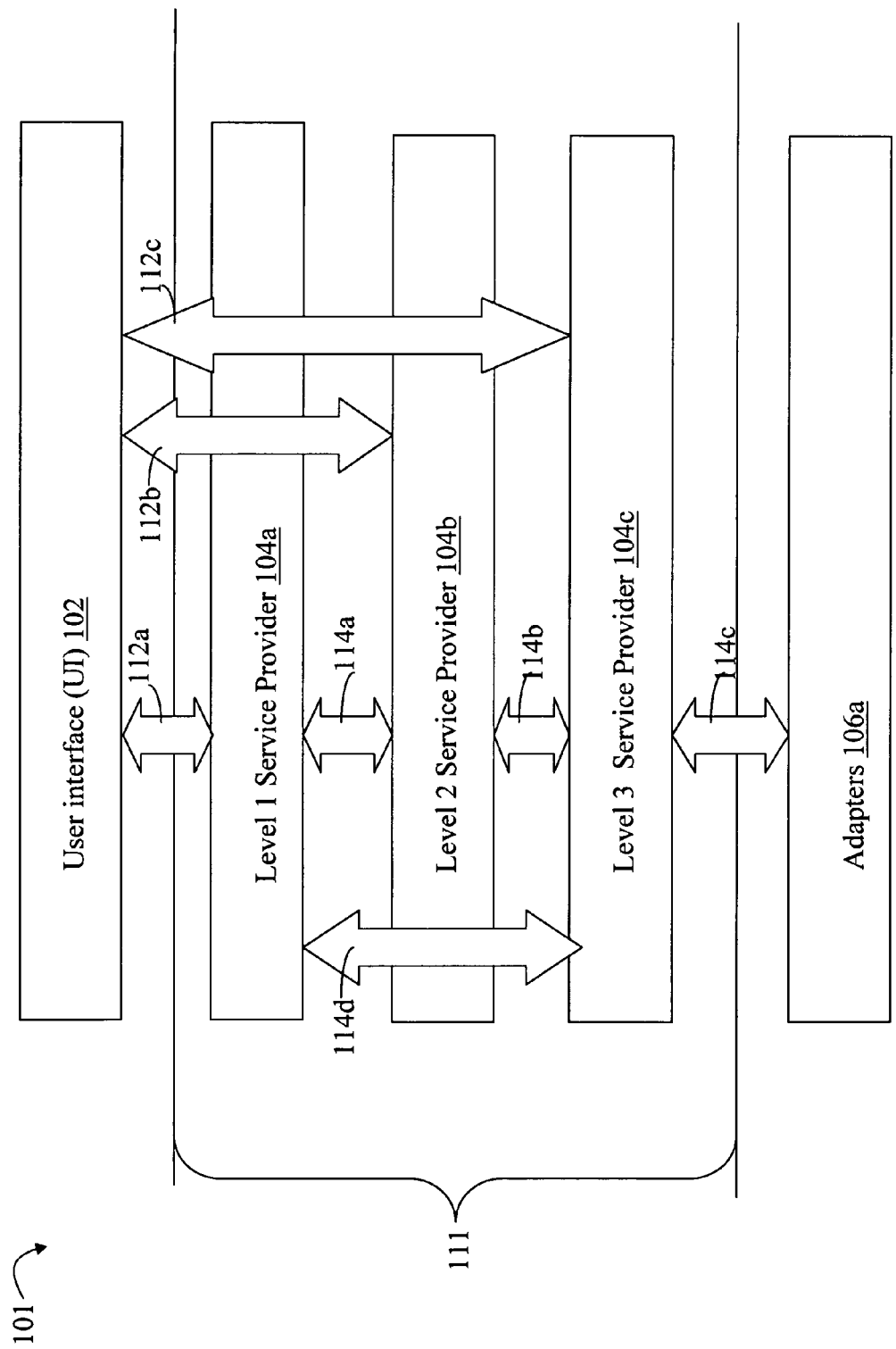
FIG. 3 is an example illustrating the different UI levels.

Referring to FIG. 3, shown is an example representation of components that may be included on the data storage system 12 for use in performing the techniques herein for data storage configuration and other tasks that may be performed in connection with a data storage system. The example 101 includes the user interface (UI) 102, one or more levels of service providers 111, and adapters 106a. In the example 101, the element 111 includes 3 service provider layers or levels 104a-104c. It should be noted that although 3 service provider levels are shown in FIG. 3, an embodiment may include any number of service provider levels.

It should be noted that the different service providers 104a-104c provide a more generalized representation of 106, 108, and 110 as illustrated and described in connection with FIG. 2.

The adapters 106a are used in connection with facilitating communications between the service providers, such as the level 3 service provider 104c, and other components. The different service providers included in the example 101 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106a may convert a service provider API to the API of another component. As an example, the service provider 104c may perform a call to an external component to create a file system. An adapter 106a may be used as an intervening layer between 104c and the external component in which the adapter 106a converts the API call from 104c to the API of the external component. The conversion may include, for example, mapping parameters between the API calls, performing multiple calls to the external component for the one API call from 104c, and the like. It should be noted that an adapter 106a may not utilized if such conversion is not needed.

As mentioned above, the user interface (UI) 102 provides for one or more different types of user interfaces and associated data. For example, as mentioned above, the UI 102 may provide support for a graphical user interface (GUI), command line interface (CLI), application programming interface (API), and the like, to support user interactions such as a data storage administrator in connection with performing different tasks. Each of the different service provider levels of 111 may be used in connection with a UI associated with that level to provide a different logical view and level of abstraction with respect to a data storage configuration task to be performed for an application executing on one of the hosts. In connection with the techniques herein, a user may interact through the UI 102 with any one of the different levels of service providers 104a-104c when performing data storage configuration requests. Interfaces used in connection with each of the service providers of 111 may provide a different level of detail or abstraction with respect to the underlying operations and tasks performed on the data storage system in accordance with different levels of user sophistication and knowledge. As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or a minimal amount of automation. The UI 102 may provide multiple different user interfaces in accordance with the different levels allowing a user the option of connecting and interacting with the data storage system at any level. By allowing a user to select a level of interaction and automation, the techniques herein provide a user with a flexible approach to choose deeper levels and entry points (e.g., level 3) providing less automation and more detail as well as selection of other levels (e.g., level 1) when greater automation of best practices is desirable.

For example, level 1 service provider 104a may provide a beginner or most simplistic view of the data storage system and tasks performed for data storage configuration. Interaction with the level 1 service provider 104a requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 101 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for a number of mailboxes for storing data of an email application executing on one of the hosts. The level 1 user may specify a minimal amount of information in connection with the request such as only a number of mailboxes. A user may interface with the data storage system using a GUI and issue the data storage configuration request. The language and terminology of user interactions via the GUI may be customized for the level 1 user of the email application. In connection with the same email application, a more knowledgeable user may choose to issue a data storage configuration request via a GUI for a same number of mailboxes by interacting with level 3 service 104c. At level 3, the user provides more detailed information about the request regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file created, and the like. In connection with the type of file created, this may be particular to the email application. A file may be a database or a log file. The log files are used to keep a record of transactions taking place and may be used in connection with recovery operations. The database files hold mailbox stores such as email data. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104b and 104c. Different defaults for the particular application may be used by service providers 104b and 104c. For example with reference to the level 1 request for the email application described above, the level 1 service provider 104a may communicate with the level 2 service provider 104b. Provider 104b may then communicate with the level 3 service provider 104c to implement the request and allocate the requested storage along with specifying other defaults such as, for example, a default level of data protection. The service provider 104c may communicate with other data storage system hardware and/or software when implementing the configuration request.

As illustrated in the example 101, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104a. In response, the level 1 service provider 104a may issue more than one request to provider 104b. In turn, each request to provider 104b may result in one or more requests to provider 104c which, in turn, communicates with adapters and other code modules to perform the requested operation.

The data storage configuration request may identify the user (e.g., by user identifier or other authentication information), the application for which the request is being made, and any user selections or input parameters.

In one embodiment, the service providers 104a-104c may be code modules which are included in the same appliance. Each of the service providers 104a-104c may provide a published interface or API (application programming interface). A first service provider at level n may issue a request of another lower level service provider by issuing an API call to the lower level service provider. The API may also be used to facilitate communications between the UI 102 and the different level service providers of 111. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 111 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

An embodiment may determine the level at which a user interacts with the system using a variety of different techniques. With reference to FIG. 3, a user may be allowed to interact at any of the 3 levels. The menus may be directed to a level 1 user. The user may select whether to interact at a lower level by selecting further detailed menu options providing more detailed information at lower levels. As a variation, a user may have associated roles or permissions. If the user does not have the associated roles or permissions to perform operations or view such detailed information associated with particular levels, the associated menu options, wizards, and the like, may not be displayed or may otherwise be disabled when interacting with the particular user.

As a variation to the foregoing, the levels exposed to a user may be limited in that a user may not be allowed to interact with one or more lower levels. For example, user interaction with the data storage system may start at level 1 and provide wizard or other menu options for more detailed selection by the user for level 2. However, information and interactions at level 3 may never be exposed if the product is intended only for a certain level of users or a particular target market. In other words, the capability to drill down and interact may be limited to only levels 1 and 2 but not level 3.

As will also be described in more detail below, an embodiment may also utilize user preferences to determine the initial or default level of interaction and exposure. For example, user preference settings stored on the data storage system or on the host may specify a default level used for the user interface menus, language, and the like. No further detailed buttons or drill down capabilities may be provided via the interface unless the user changes his/her preferences and selects to apply such preferences. In such an embodiment, the user interface may be presented from a viewpoint of the user preferences having content, structure and an interface language/terminology in accordance with the selected level. The user preferences may be stored as configurable parameters or options on the appliance or remotely located, such as on the host, workstation for use with a browser, and the like. For example, the configuration file for the users may be stored on the host or workstation having a web browser. Code executing on the host or workstation may read the configuration file and communicate the preferences to software on the appliance or other data storage system providing data for populating and presenting the user interface. A user may change the preferences via menu options, directly editing a configuration file, and the like. As a user gains experience and knowledge, a user may select to interact at a lower level for some or all requests. As will also be described below, an embodiment may provide for automatically adjusting the UI and level at which a user interacts at a first point time based on one or more user interactions prior to the first point in time.

Figure 4:
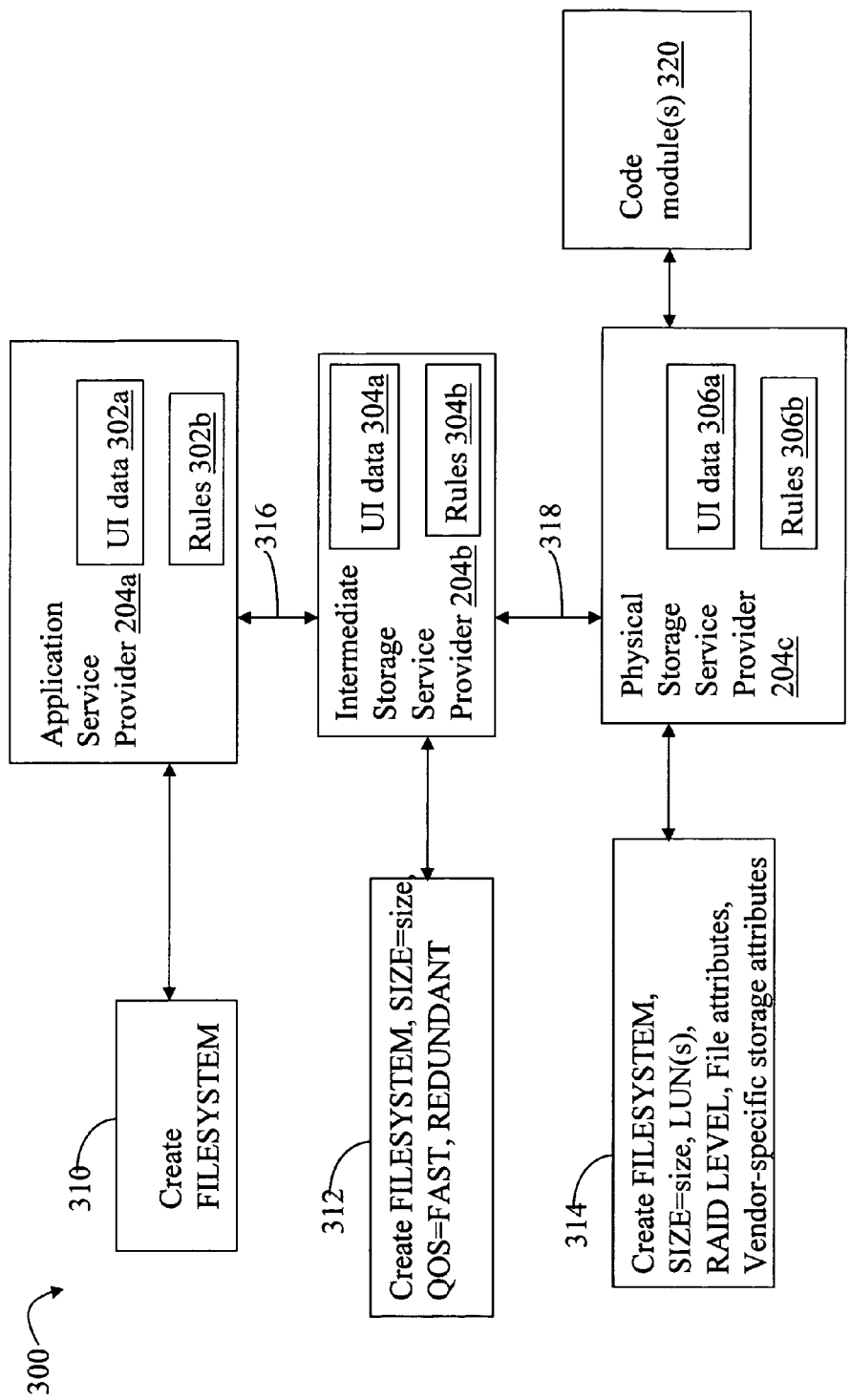
FIGS. 4 and 5 are more detailed examples illustrating information that may be associated with each UI level in connection with a request to create a file system and provision storage for the file system.

Referring to FIG. 4, shown is an example illustrating how the different service providers of FIG. 2 may be used to perform the mapping between levels to perform a data configuration request, and also provide different levels of user interaction.

Elements 204a, 204b, and 204c correspond to the different levels of service providers described in connection with FIG. 3. Elements 310, 312 and 314 represent the information obtained via the UI at the various levels and service providers. Element 310 represents the information obtained for a user connected at level 1 to service provider 204a. Element 312 represents the information obtained for a user connected at level 2 to service provider 204b. Element 314 represents the information obtained for a user connected at level 3 to service provider 204c. Information obtained by a user at level n may be subsequently passed on via an API call to one or more other lower level (e.g. greater than n) service providers in order to perform the user request.

Element 312 may also represent the information communicated by the service provider 204a after the provider 204a applies mapping rules 302b to 310 resulting in an API call of the form as illustrated in 312. Element 314 may represent the information communicated by the service provider 204b after the service provider 204b applies mapping rules 304b to 312 resulting in an API call of the form as in 314

With reference to the example 300, if a user interacts with the system at level 1, the application service provider 204a obtains the data included in 310 which is passed on in form 312 to provider 204b as illustrated by 316. Provider 204b in turn maps data from form 312 to the form of 314 to provider 204c as illustrated by 318. If a user interacts with the system at level 2, the intermediate service provider 204b obtains the data included in 312 and passes the data of 312 to provider 204c in the form represented in 314. If a user interacts with the system at level 3, the physical storage service provider 204c obtains the data from the UI in the form 314. In this example, the provider 204c may implement or execute the one or more operations to perform the request indicated by 314 by invoking one or more other code modules 320. The code modules 320 may communicate with other components on the data storage system to perform the requested task.

In one embodiment, the UI 102 of FIGS. 2 and 3 may query each service provider to obtain the appropriate UI data 302a, 304a and 306a via API calls in accordance with a user selected or specified level of interaction using any one of a variety of different techniques as described herein and known to those skilled in the art. The UI data 302a, 304a and 306a may be used to populate the menus and other UI elements that may be displayed to a user in accordance with the particular level of user interaction for that particular user.

The example 300 illustrates the user inputs for creating a file system for an application with interactions at the various levels 1-3. Element 310 illustrates the input received from the most basic user level 1 in which the user may enter a command to create a particular file system. The file system created with user level 1 interactions uses all default options specified via mapping rules and API calls to levels 2 and 3. For level 2, the parameters input from the user or received via mapping and an API call from level 1 are illustrated in 312. By default, parameters related to size (e.g., SIZE=size), device speed, (e.g., QOS=FAST, wherein QOS is "quality of service") and data protection (e.g., REDUNDANT) are specified. At level 2, there is a level of abstraction from the underlying data storage system but the attribute characteristics may be specified. For level 3, the parameters input from the user or received via mapping and an API call from level 2 are illustrated in 314. At level 3, details regarding the underlying data storage system, such as devices, RAID levels, vendor-specific attributes, which file system (e.g., NFS, CIFS) or block storage, and the like, are specified. For example, level 2 indicates that storage for the file system is to be located on a FAST device. Level 3 mapping rules map the abstract FAST attribute to the particular device (e.g., LUN(s) on the data storage system that may be characterized as FAST with respect to other data storage devices). As more physical devices and/or logical devices added which are also FAST, different LUNs may be used and specified by the mapping rules 304a without any change in the data of 312. Thus, data obtained from users interacting at level 1 and 2 need not change as the underlying data storage system changes when devices are added/removed.

In connection with the bottom most level service provider 204c or service provider associated with the greatest level of user knowledge and detail, 204c may optionally not include and utilize rules 306b. An embodiment may have the language of the user interface map directly with low level calls to code modules to implement the request. In other words, the language terms and parameter values specified by the user at level 3 may not require mapping in order to be utilized by the system.

As will be appreciated by those skilled in the art, the examples, such as those of FIG. 4 and following, may be simplistic for purposes of illustration of the techniques herein. At lower levels, there may be greater amounts of detail and complexity in order to provide automation of the best practices.

Figure 5:
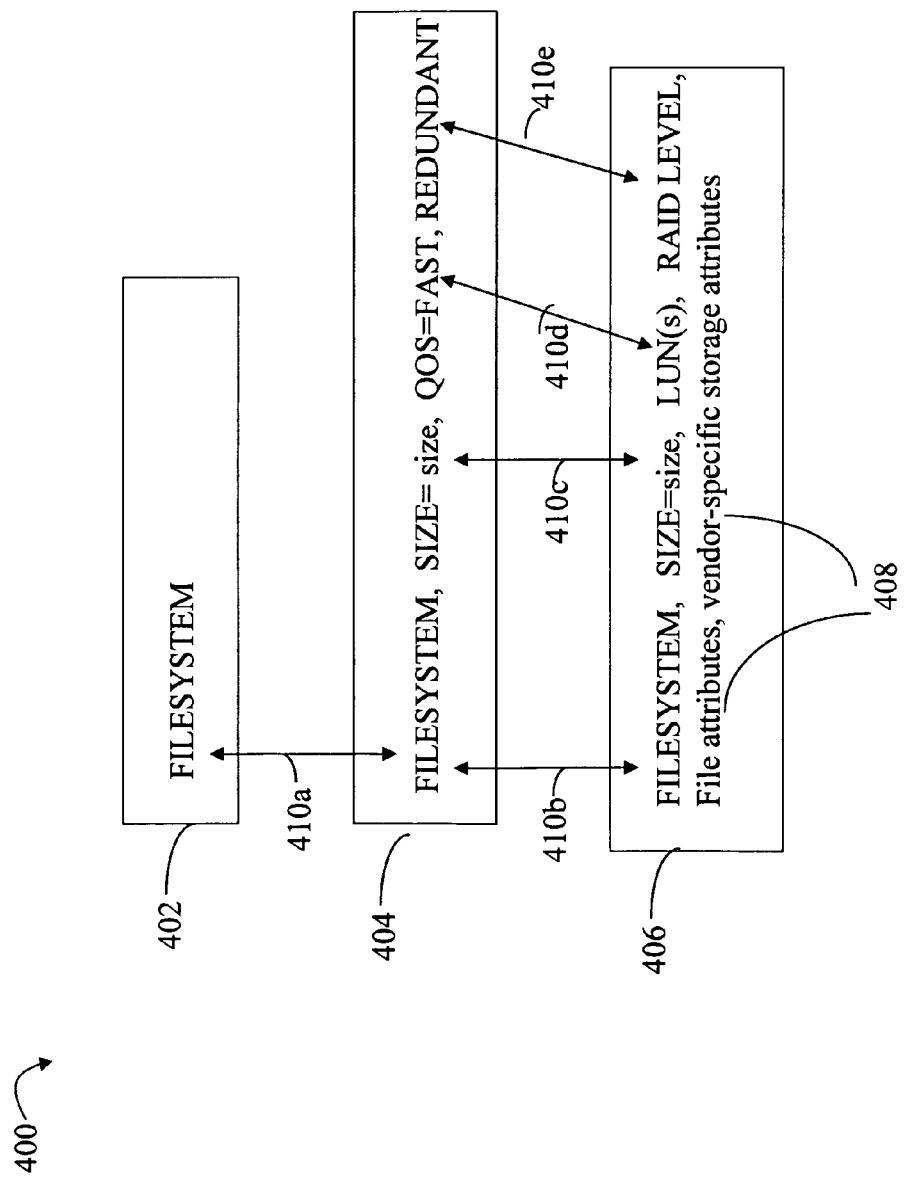

Referring to FIG. 5, shown is another representation of the mapping of the different parameters that may be performed by the rules of the different service providers. The example 400 further illustrates the parameter mapping between levels. Element 402 represents the data obtained by service provider 204a. Element 404 represents the data obtained by service provider 204b via direct user interaction or from provider 204a. Element 406 represents the data obtain by service provider 204c via direct user interaction or from provider 204b. The FILESYSTEM type is passed 410a as a parameter from level 1 to level 2, and then passed to level 3 410b. Level 1 mapping rules may define defaults based on best practices for the particular application as indicated by the parameters SIZE=size, specifying a default size for the file system, and QOS=FAST, REDUNDANT, specifying default quality of service (QOS) parameters for a fast device with redundancy. Level 2 mapping rules map the parameters of 404 to parameters of 406 as indicated by 410c, 410d and 410e. Additionally, level 2 mapping rules introduce additional default parameter values as indicated by element 408 when interacting with level 3.

As described herein, the user can connect and interact with the data storage system at various levels to perform different operations and tasks such as data configuration and provisioning requests and other data storage management tasks. The user, system administrator, and the like, may select the level of interaction that can vary with each request. The mapping rules provide for specifying any defaults that may be needed to implement the request. When implementing a same data configuration request for different applications, the defaults introduced at one or more levels may vary with application. The mapping rules at the different levels allow for implementation of best practices while insulating and abstracting the details from the user. For example, the rules used by the application service provider of FIG. 3 may be used to implement application specific best practices. The rules used by the intermediate storage service provider may be used to implement best practices with respect to the underlying data storage system. As such, using the techniques herein, a framework may be defined which provides customized interfaces for different user levels of interaction with respect to a particular application when performing a data service or other request in connection with data storage configuration and/or management for the particular application. Rules included in the framework may be selected for use depending on the application, data service, task or operation, and defined set of one or more user groupings. A user grouping may be defined as a set of one or more user levels and associated service providers. For example, FIG. 3 illustrates a single user grouping of 3 levels. A data service may be defined as a particular service performed in connection with a data storage configuration request.

In connection with the different one or more user groupings each corresponding to a different user level and associated service provider as described above, a different UI may be presented to the user. In particular with reference to FIG. 5 where there are 3 levels, a user interacting at level 1 may be a novice user and may be presented with a UI in which the user provides a name for the file system and no other parameters as indicated by 402. A user interacting at level 2 may be an intermediate user and may be presented with a UI in which the user provides parameters of a file system name, size, and attributes relates to QOS of fast and redundant of 404. A user interacting at level 3 may be an expert user and may be presented with a UI in which the user provides parameters of a file system name, size, LUNs, RAID level, and other file attributes and/or vendor-specific storage attributes of 406. The different UIs associated with a user grouping, for example, to perform a particular task or data service for an application, may be referred to as a UI set.

In connection with the customized UIs that can be provided to a user, the user may have a different level of expertise in connection with different applications, data services or tasks, and the like. Thus, it may be desirable to provide customized UI selection for each user and also provide a further granularity of UI customization for each user by allowing different UIs and levels of interaction for each user in accordance with each possible UI set or user grouping. For example, an embodiment may have a first UI set of 3 possible UIs and corresponding levels of interaction as described in connection with FIG. 2. The first UI set may be used in connection with performing data storage provisioning for an email application. Similarly, there may be a second UI set of 3 possible UIs and corresponding levels of interaction as described in connection with FIG. 2. The second UI set may be used in connection with performing data storage provisioning for an database application. A user may be a novice in connection with provisioning storage for use with the email application and the user may choose to interact with the system at the novice level 1 using the associated level 1 UI. That same user may also be an expert in connection with provisioning storage for use with the database application and the user may choose to interact with the system at the expert level 3 using the associated level 3 UI. What will be described in following paragraphs are techniques that may be used in connection with providing, for each user, customizable UI levels for different tasks, applications, and the like, as may be associated with different UI sets.

As described herein, a different UI set may be associated with each unique combination of application, data service or task, and the like. As such, a single user may have a different knowledge level and/or otherwise may have reason to vary a level of interaction when performing operations associated with each UI set. For example, a different UI set may be associated with each of the following: issuing requests in connection with provisioning or configuring storage for a particular email application, provisioning or configuring storage for a particular database application, monitoring a data storage system, migrating data, diagnosing system problems, adding or expanding data storage capacity such as adding a new device, destroying or removing data storage capacity such as when removing an existing device, providing data storage protection such as through redundancy, servicing the data storage system such as by applying software upgrades, patches, and the like. A single user may have a different level of expertise and interaction when performing requests associated with each of the foregoing UI sets. What will be described in following paragraphs are techniques that can be used to track and manage the different customized levels and associated UIs for each user.

Figure 6:
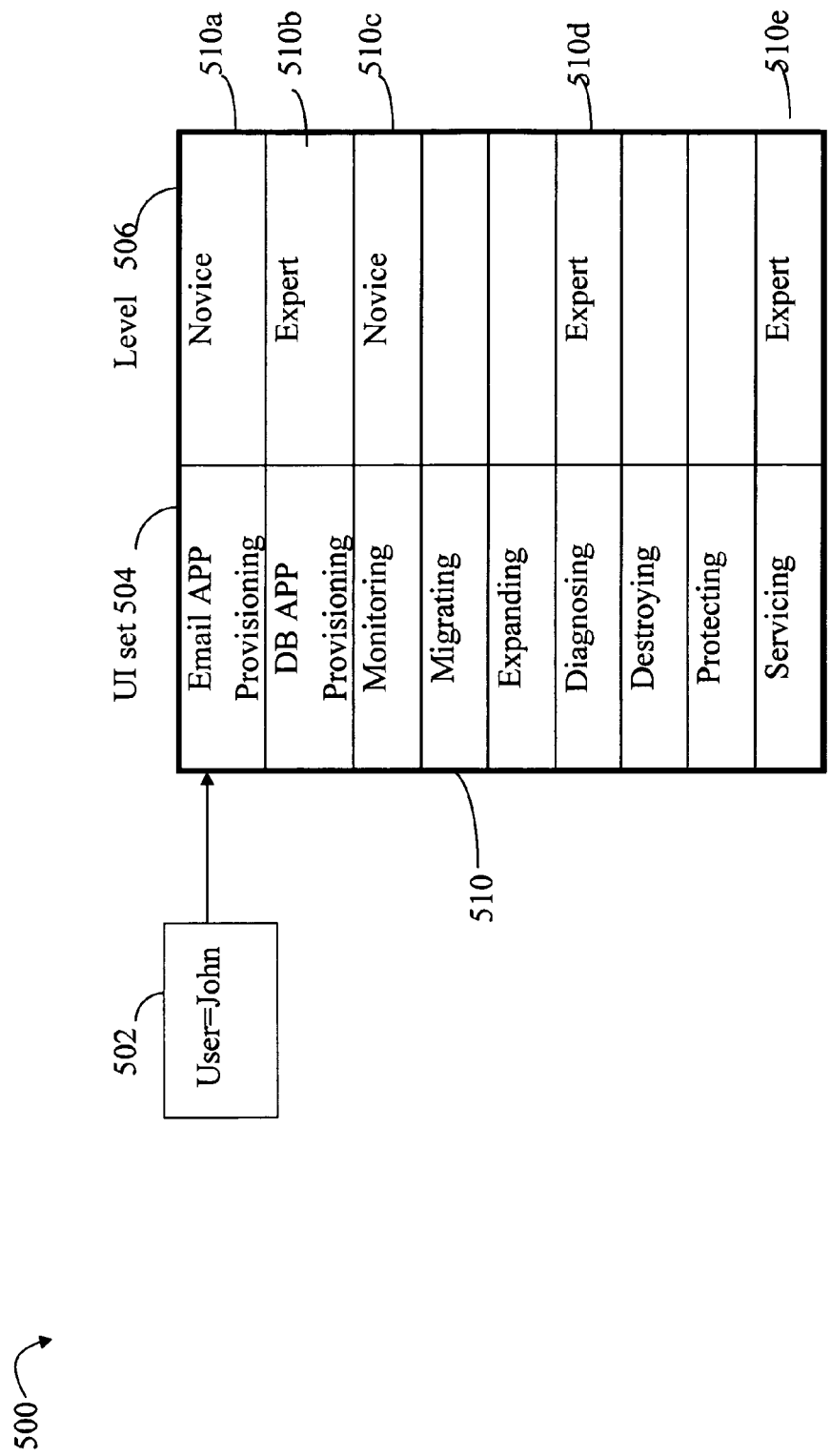
FIG. 6 is an example of user information that may be associated with each user in connection with each UI set in an embodiment using the techniques herein.

Referring to FIG. 6, shown is an example of information that may be associated and stored for a particular user in connection with the techniques herein. The example 500 illustrates user information 510 that may be maintained for a single user John 502. The information 510 is represented in tabular form for purposes of illustration only and can actually be stored in any organization, using any data structure, and in any data container, storage or repository known in the art. Information of 510 for each user may be stored, for example, in a data storage location including user information as represented by element 121 of FIG. 2 for use in connection with the techniques herein for providing different levels of customized UIs and user interactions. The table 510 may include a row for each possible UI set that may be available to a user. For each possible UI set, a corresponding UI level may be specified. Table 510 includes a column of UI sets 504 and corresponding levels in column 506. For an entry or row in the table 510, the level indicated in column 506 may specify a level of user interaction when performing operations and issuing requests for the application, task, and the like, associated with the UI set in column 504. With reference to the example 500, John is an expert (e.g., level 3) at performing tasks and issuing requests associated with UI sets for 510b, 510d, and 510e but is a novice (e.g., level 1) when performing tasks and issuing requests associated with UI sets for 510a and 510c. It should be noted that a blank entry may mean to use some system or other default level, or may otherwise indicate that user John is not allowed to view or perform operations using the UI set. Table 510 may be initialized, for example, by an administrator for user John as part of account management and/or creation.

Figure 7:
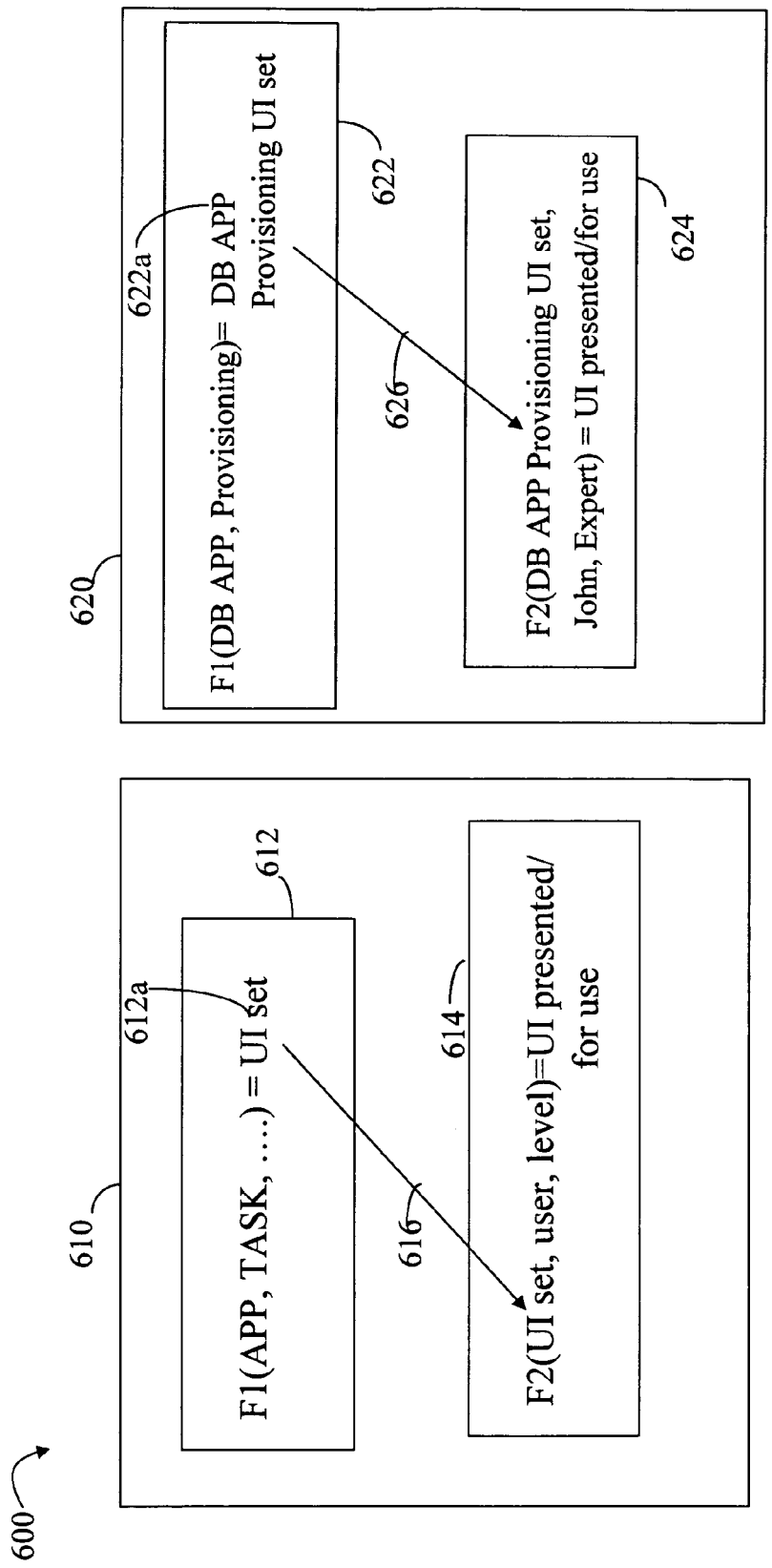
FIG. 7 is a representation of how a UI set may be selected and how a UI of a particular UI set may be selected in an embodiment using the techniques herein.

Referring to FIG. 7, shown is an example illustrating how each UI set may be specified and how a particular UI presented for a particular user may be selected. Element 610 is a general representation of the foregoing, and element 620 is an example of how a UI may be selected and presented in connection with user John having user information 510 as described in connection with FIG. 6. In other words, element 620 is a particular instance of the more general representation of element 610.

Element 612 represents how a UI set may be determined. Element 610 includes a function F1 which may have one or more input parameters such as APP (application), TASK (task or operation type), and the like. F1 may have one or more dimensions or parameters although two are illustrated herein. For each unique possible combination of input parameters, a different UI set or value for 612a may be determined. The UI set 612a may be an input to another function F2 represented by 614 to select a particular UI for use in connection with user interactions. F2 may have input parameters of UI set, user, and level used to select a UI presented/for use when interacting with a particular user. Element 620 includes elements 622 and 624. Element 622 illustrates that a UI set may be associated with a particular combination of APP (application) and TASK where the application is a database application (DB APP) and the task is to provision or configure storage (Provisioning) for the database application. Element 622a may be, for example, an identifier uniquely identifying the UI set (e.g., set of UIs for the different levels of interaction) of possible UIs for the particular input parameter values of F1 illustrated in 620. For example, the UI set identified by 622a may include 3 possible UIs for each of the 3 different levels illustrated in FIGS. 2 and 3. Element 624 may represent how one of the UIs of the UI set is selected for the particular user. In this example of 624, values from entry 510b of table 510 of FIG. 6 are used to select the UI of the UI set corresponding to the expert level ($3^{rd}$ parameter of F2) for user John (second parameter of F2).

Figure 8:
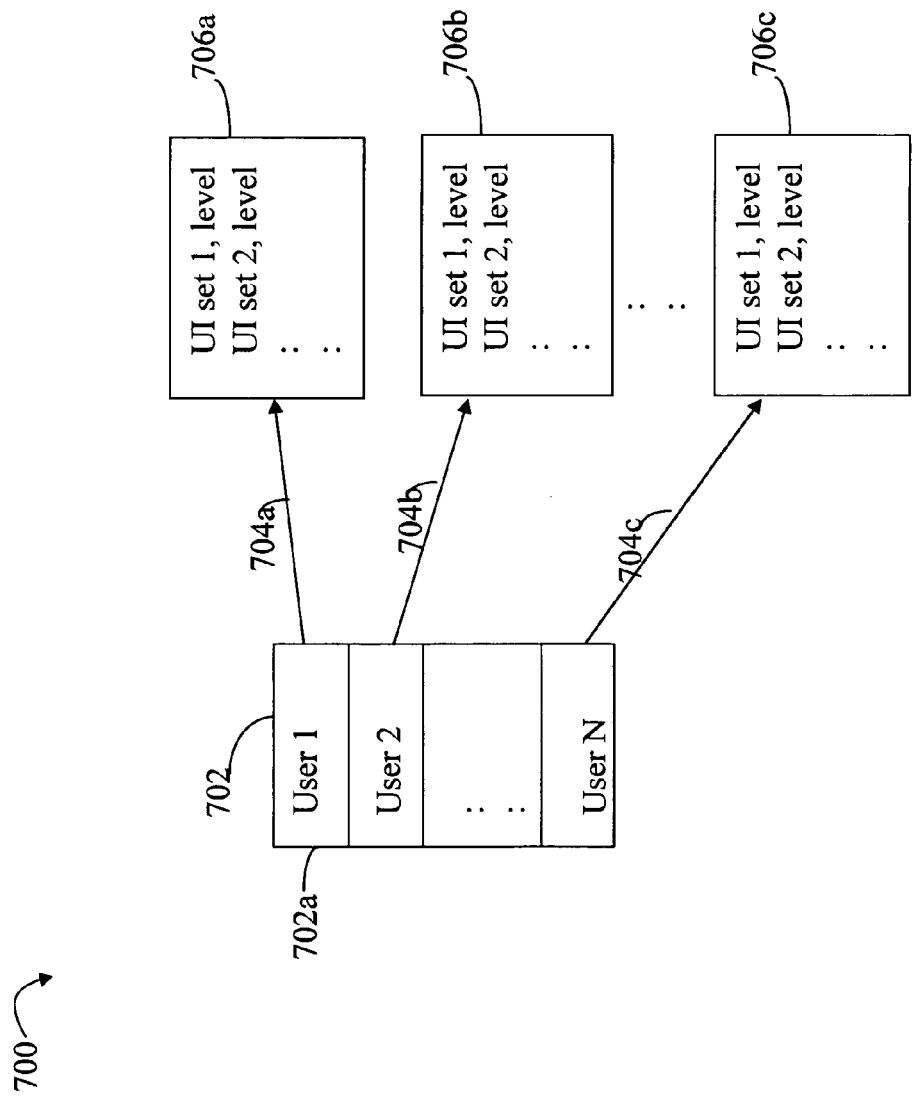
FIG. 8 is a representation of user information that may be stored for a plurality of users in an embodiment using the techniques herein.

Referring to FIG. 8, shown is an example representation 700 of multiple instances of user information that may be logically organized and stored for each user. The example 700 includes a table 702 of multiple users. Each user is indicated by a separate entry in the table 702. Associated with each user entry of table 702 is an instance of the user information as included in the table 510 of FIG. 6. The instances of user information are denoted as 706a-706c and are associated with a particular user as indicated by the corresponding arrows 704a-704c. Information of example 700 may be stored in the location represented by element 121 of FIG. 2.

Thus, the example 700 represents one way in which user information may be logically organized in connection with providing customized UIs for each user for the different UI sets and associated applications, tasks, and the like, that may be performed by each user.

An embodiment may also use other user information in connection with providing customized UIs for each user that will now be described.

Figure 9:
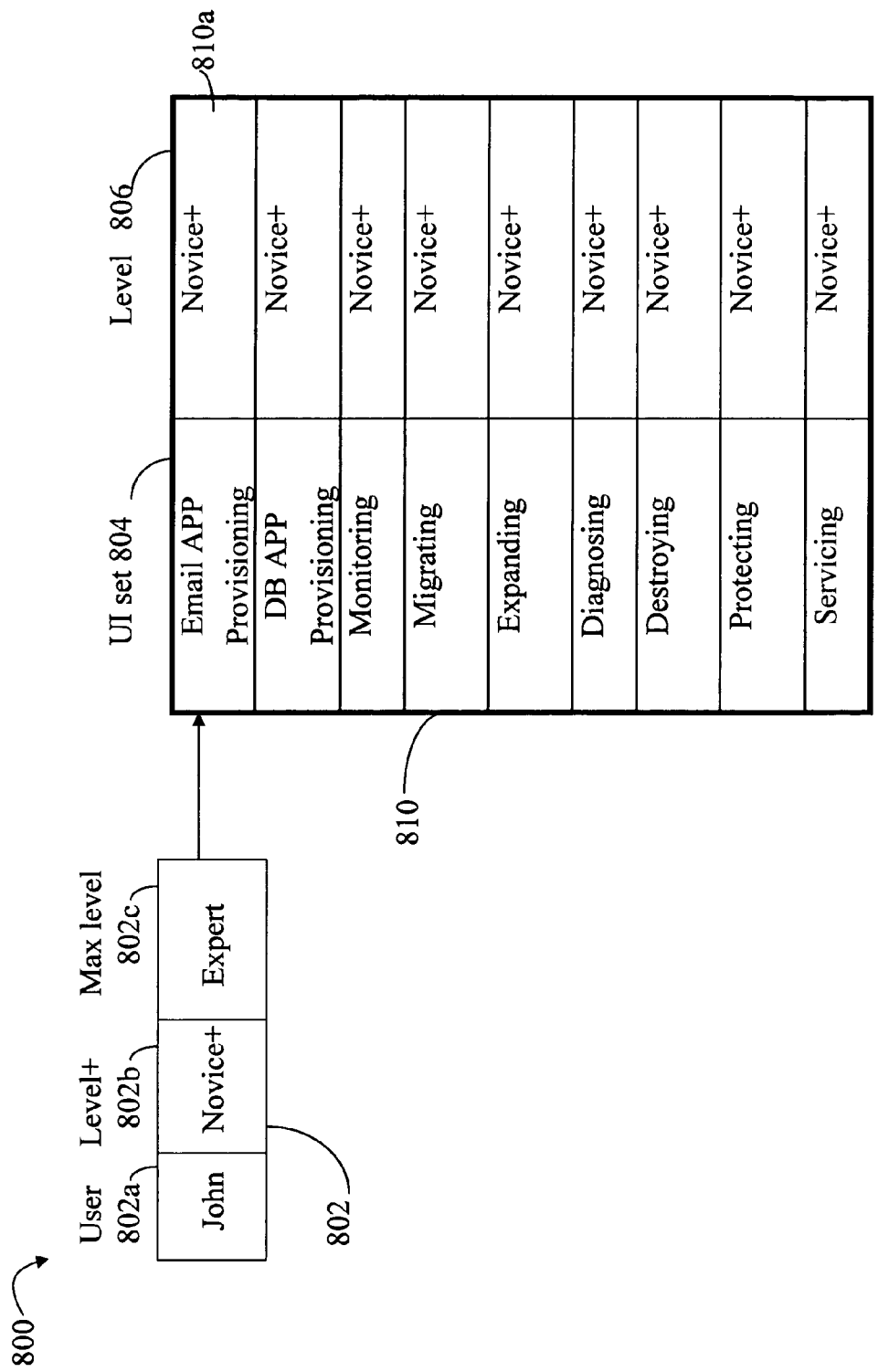
FIG. 9 an example of user information that may be associated with each user in connection with each UI set in another embodiment using the techniques herein.

Referring to FIG. 9, shown is an example of information that may be associated and stored for a particular user in connection with the techniques herein. The example 800 illustrates user information 810 that may be maintained for a single user John. An embodiment may use the information of FIG. 9 rather than the information described in connection with FIG. 6 for each user.

Element 802 may represent information that may be specified in connection with initializing the table of user information 810. Element 802 may include an identifier 802a specifying a particular user, a level indicator 802b, and a max (maximum) level 802c. Element 802b may identify a particular level of interaction, such as novice (level 1) or expert (level 3). Element 802b may also optionally include a UI extension indicator, such as a "+" sign. The extension indicator indicates that the specified level is a starting level and that the user 802a may be allowed to use the UI at levels higher than that as indicated in 802b. The level indicated in 802b in this example is Novice and may specify a starting or default level which is used in initial presentation and interactions with John during a session. A session may be defined, for example, as a set of interactions associated with a user when logged on to the system. The session may terminate when the user logs off or the session may be otherwise terminated. Although a "+" is used herein for purposes of illustration, other elements, characters, and the like, may be used to represent when a UI extension indicator is specified. Element 802c specifies an optional maximum UI level. Element 802c may be characterized as a "cap" or maximum UI level that may be presented and accessible to the user John. To further illustrate, if the UI extension indicator "+" is omitted, John may only have access to UI level Novice. When the "+" is specified, the UI displayed initially may be associated with the Novice level, and John may be able to utilize UIs associated with one or more levels higher than Novice (e.g., UIs associated with levels indicating more experienced user levels than Novice). Max level 802c indicates that John may be allowed to display and interact at any level between novice, as indicated in 802b, up to and including expert, as indicated by 802c.

Element 810 represents a table of user information indicating a UI set 804 and corresponding level 806 similar to that as described in connection with table 510 of FIG. 6. In this example 800, however, the level 806 may specify one of the possible levels of interaction associated with a UI set of 804 and may also optionally include the UI extension indicator, "+".

An administrator may, for example, specify the data of 802 which may then be used to initialize or populate the table 810 of FIG. 9 for a particular user. After initialization, the table 810 may then be optionally modified or further customized for the user John via manual and/or automated techniques. Examples of automated customization are described in more detail in following paragraphs. The user information 810 may be customized, for example, by changing a level of 806 and/or adding/removing the UI extension indicator, "+", for an entry in 810.

The data of 802 may be specified when first creating the table 810 for a user. The data of 802 may also be optionally stored for further use, for example, if additional UI sets are added for use with the techniques herein.

As a variation to the foregoing, each entry in the 810 may include a max level rather than have a single max level associated with a user as indicated by 802.

Figure 10:
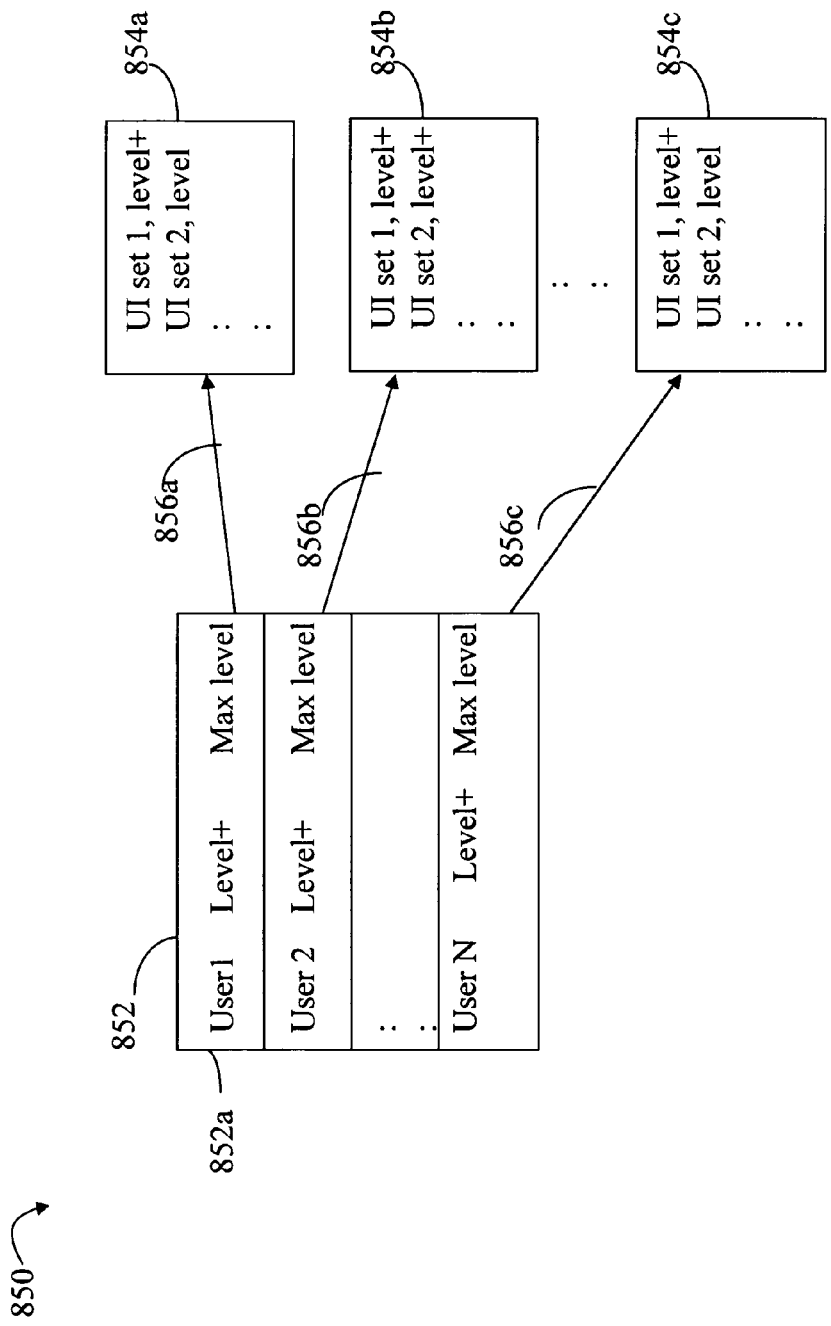
FIG. 10 is a representation of user information that may be stored for a plurality of users in another embodiment using the techniques herein.

Referring to FIG. 10, shown is an example representation 850 of multiple instances of user information that may be logically organized and stored for each user. The example 850 includes a table 852 of multiple users. Each user is indicated by a separate entry in the table 852. Associated with each user entry of table 852 is an instance of the user information as included in the table 810 of FIG. 9. The instances of user information are denoted as 854a-854c and are associated with a particular user as indicated by the arrows 856a-856c. Information of example 850 may be stored in the location represented by element 121 of FIG. 2.

Thus, the example 850 represents another way in which user information may be logically organized in connection with providing customized UIs for each user for the different tasks that may be performed by each user.

In connection with the foregoing description, the UI extension indicator (e.g., "+") may provide for dynamic extension of the UI for the associated user. In contrast, omitting the UI extension indicator may provide for static UI specification for a particular user. When the UI extension indicator is specified in an entry of a user information table, the default or starting UI level may be adjusted manually and/or automatically using other techniques described in more detail below.

What will now be presented is a more detailed example with associated UIs that may be displayed in connection with user John having a table of user information as described in table 810 of FIG. 9. With reference back to FIG. 9, John may be interacting with the data storage system to perform provisioning and data storage configuration for an email application so that entry 810a of table 810 is used to determine the appropriate UI displayed and level of user interaction. As indicated by 810a, John has a starting or default level of Novice and the UI display may be initialized accordingly.

Figure 11:
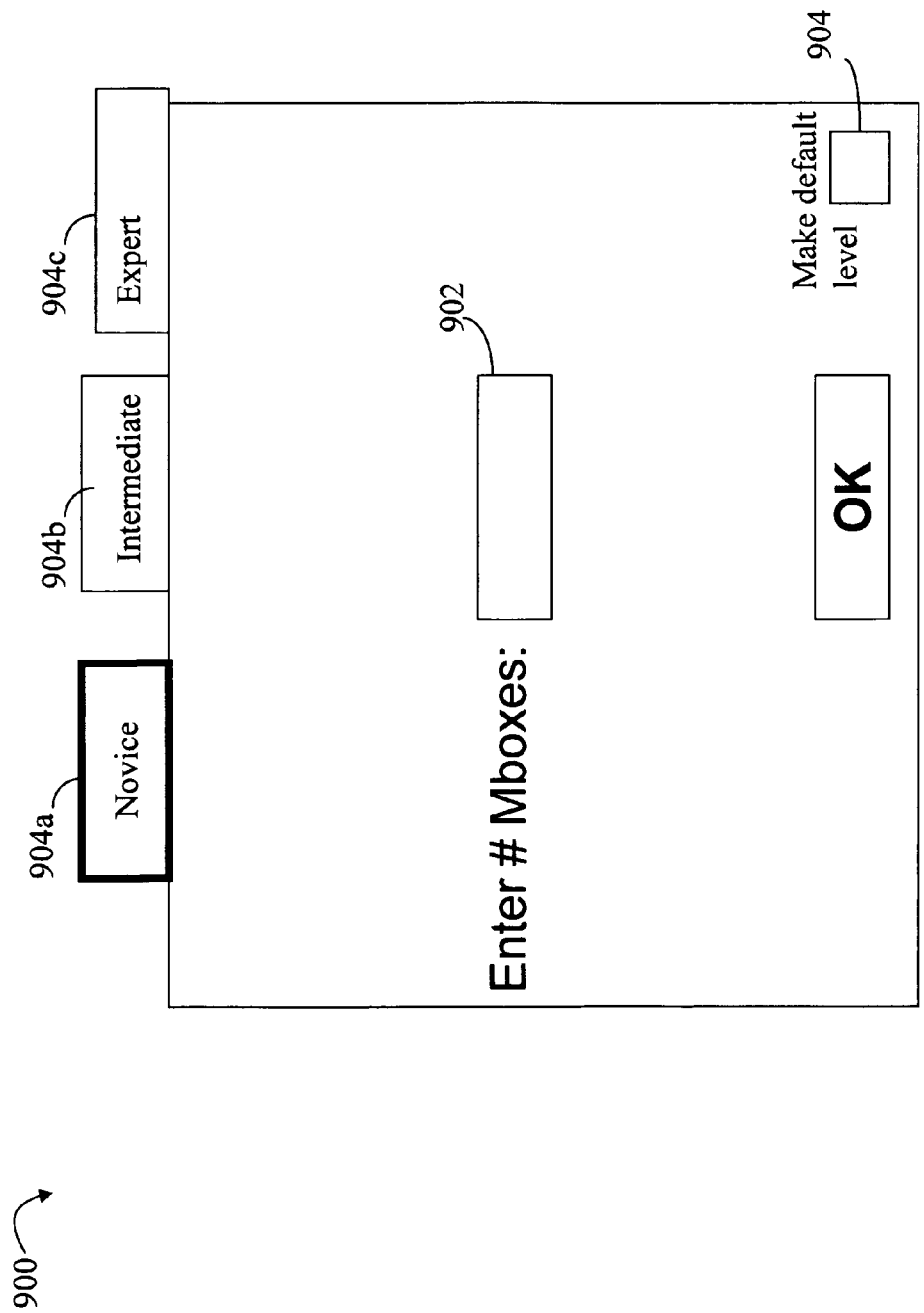
FIGS. 11, 12, and 16-18 are examples of UIs that may be displayed in an embodiment using the techniques herein.

Referring to FIG. 11, shown is an example of a UI that may be displayed in connection with a session for user John based on entry 810a of FIG. 9. The current default or starting level of novice is indicated by the highlighted novice tab 904a. Since the UI extension indicator + is specified in 810a indicating additional levels of allowable or possible UI exposure, additional tabs associated with higher levels intermediate 904b and expert 904c are also displayed. Since the max level for user John as indicated by 802c of FIG. 9 is expert, both tabs 904b and 904c are displayed and may be selected by user John. As a further illustration, if instead, the max level of 802c for John was intermediate, an embodiment may choose to omit displaying and/or otherwise making available for selection, the expert tab 904c. An embodiment may also have the expert tab 904c included in the display based on previous user interactions with John, for example, indicating that John has knowledge and is capable of performing operations at the intermediate level. In connection with the novice or level 1 UI, only a single parameter 902 may be specified. John may enter a value for 902 indicating a number of mailboxes (Mboxes) for which storage will be provisioned. After entering the value in 902, John may select OK in order to implement the desired provisioning.

The example 900 also includes an option 904 which provides for making the currently active UI level as indicated by the bolded tab 904a the default or starting level of interaction. Thus, a user may select to manually change the starting level of UI interaction for the UI set by selecting 904. For example, selection of 904 for user John would cause entry 810a of table 810 to be updated so that column 806 may indicate Novice as the starting or default level if it not already so specified.

Although the display of the example 900 may be initially presented to John, John may also select to not interact at level 1, Novice and may select another one of the tabs 904b or 904c to perform a provisioning request for additional mailboxes. John may select tab 904b intermediate causing an update to the UI display as indicated by FIG. 12.

Figure 12:
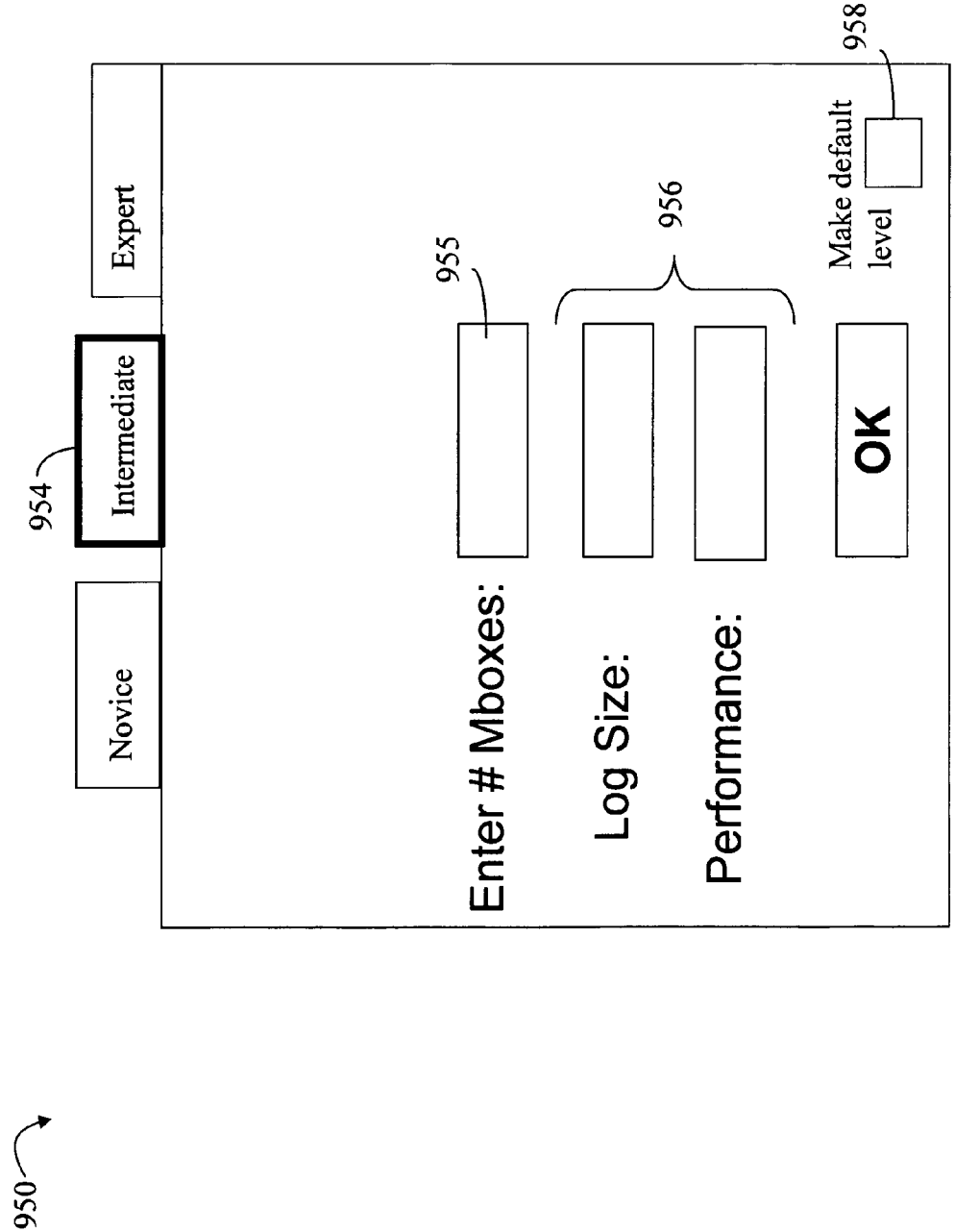

Referring to FIG. 12, shown is an example of a UI that may be displayed in response to John selecting the intermediate tab. The currently active tab is indicated by the bolded tab 954. The UI may be updated to display additional fields 956 associated with the intermediate level. A novice user may not have the knowledge about log files or performance parameters that may be associated and specified in connection with provisioning storage for use with the email application. Thus, a novice user may opt to provision storage by specifying only the information for the parameter 902 of FIG. 11. In accordance with techniques described herein, other code included in the data storage system may be used to determine in accordance with best practices the other appropriate parameters for provisioning storage for the request. John, however, has chosen to interact with the system to perform the provisioning request at the intermediate level. The example 950 displays information with the intermediate level of interaction and associated knowledge level. The intermediate level may, for example, assume that the user has additional knowledge beyond the novice and specifies the additional information of

956. In accordance with techniques described herein, other code included in the data storage system may be used to determine in accordance with best practices the other appropriate parameters for provisioning storage for the request based on the inputs provided by John for 955 and 956. Once John inputs values for 955 and 956, John selects OK and storage may be accordingly provisioned for the email application storage request. As described above, John may also select 958 to make the intermediate level his starting or default UI level when performing email application provisioning requests.

An embodiment may also not allow John to select and update the starting UI level to intermediate by selection of 958 until John has successfully completed a threshold number of one or more provisioning requests from the intermediate level.

As a variation to the foregoing example, John may interact with the system at the novice level using the UI of FIG. 11. After John inputs a value, such as 100, for the parameter 902 in connection with interacting at the novice level as indicated in FIG. 11, John may choose to not yet implement the request by selecting OK. Rather, John may select the intermediate tab after entering a value in 902 of FIG. 11 resulting in the display of FIG. 12 which is populated with the value as entered by John in 955, and additional data values in 956 automatically determined by the data storage system. The display of FIG. 12 may include in portion 956 corresponding data values determined in accordance with best practices by other code on the data storage system for the requested 100 mailboxes. In other words, John may perform the foregoing to gain knowledge and insight into how to provision storage for mailboxes for the email application by viewing what the code on the data storage system determines as data values of 956 in response to his entry of 100 mailboxes.

As mentioned above, the default or starting UI level for a particular UI set may be updated automatically as well as manually (e.g., such as via user selection of 958 of FIG. 12). An embodiment may collect information in connection with a particular user's interactions and activities and update the user's default or starting level for a UI set. For example, information regarding John's selections of the novice, intermediate and/or advanced tabs of FIG. 12 may be collected. In response, an embodiment may automatically update the starting UI level for that particular UI set. The automatic updating of the starting UI level for a UI set may be determined in accordance with one or more criteria such as, for example, John's manual selection to interact at a particular level, the number of successful provisioning requests John performs at a level, and the like. For example, code may be executed to monitor the current UI level when John performs a provisioning request and when John has specified values for the parameters presented at a particular UI level. The code may also monitor whether the foregoing provisioning request was successful or otherwise results in an error. If the request is successful, the starting UI level for that UI set may be accordingly updated to the current UI level associated with John's successful provisioning request (e.g., entry column 806 of 810 may be accordingly updated). If the request results in error or failure, then the starting UI level may not be updated (e.g., entry column 806 of 810 will not be updated).

Figure 13:
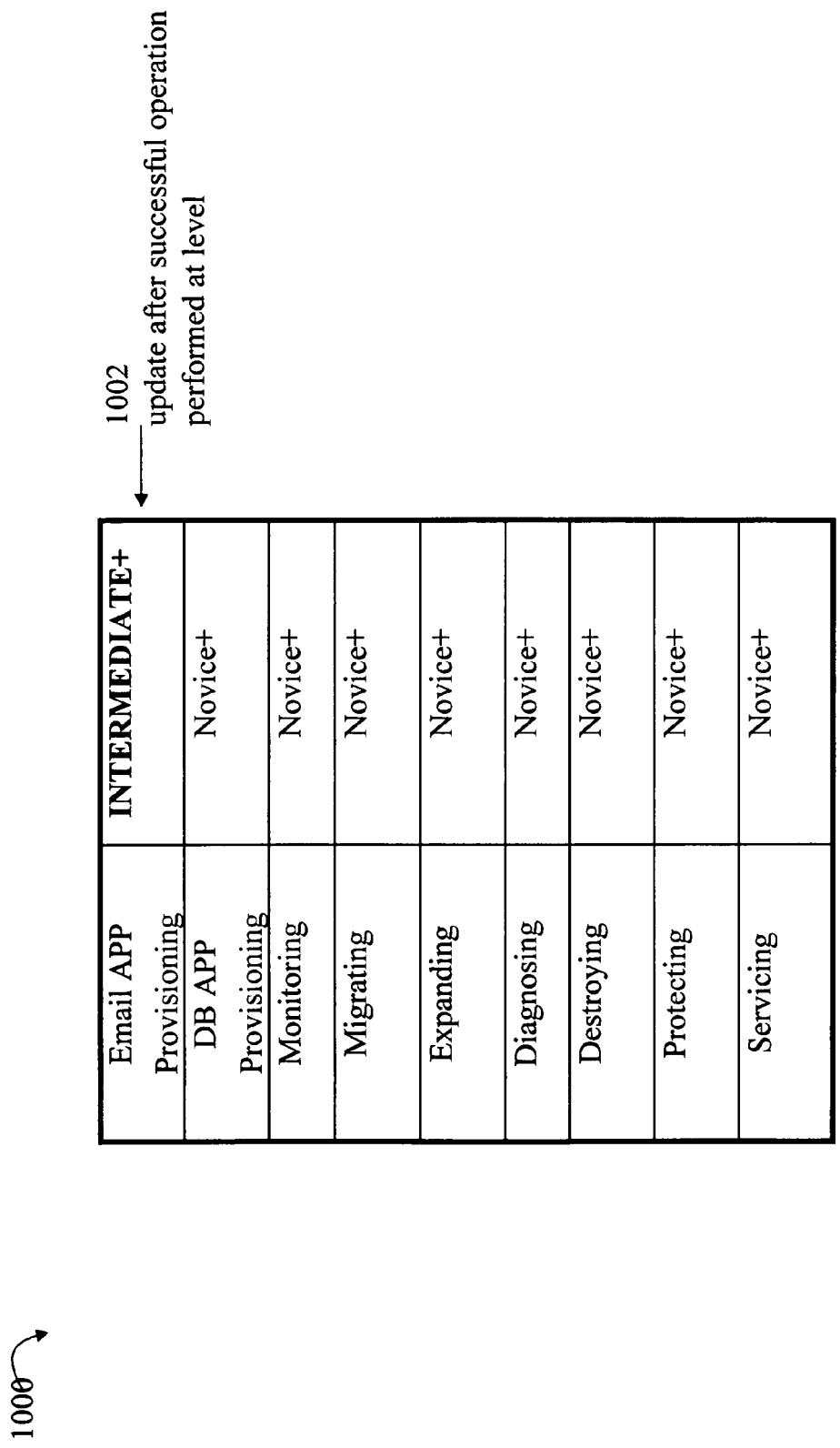
FIG. 13 is an example illustrating updating of user information in accordance with manual and/or automatic techniques that may be performed in an embodiment.

Referring to FIG. 13, shown is an example 1000 of the user information table for user John which has been automatically updated in accordance with the techniques herein. Entry 1002 may be updated, for example, if John enters values for parameters at the intermediate level and after John's provisioning request made at the intermediate level has been deemed to successfully provision the requested storage for the email application. As described above, code may perform the update in response to detecting that one or more criteria have been met, events have occurred, and the like, that may be related to John's activity and interactions in connection with the associated UI set (e.g., John's activity and interactions as related to the email application and the task of provisioning storage for the email application).

Thus, use of the UI extension indicator "+" for a particular UI set may provide for dynamic adjustment of a starting UI level for a user in accordance with manual and/or automatic techniques as may be included in an embodiment.

The user information of table 510 of FIG. 6 and user information of table 810 of FIG. 9 may be used alone, or in combination with additional user information specifying user roles and/or permissions. In other words tables 510 and 810 may be used to indicate a first set of user information specifying UI levels and levels of user interaction for different UI sets. However, the foregoing first set of user information may be used in combination with a second set of user information specifying roles and/or permissions. This second set of information may be used to indicate which of the specified UI levels and levels of user interactions of the first set are allowable or possible.

Figure 14:
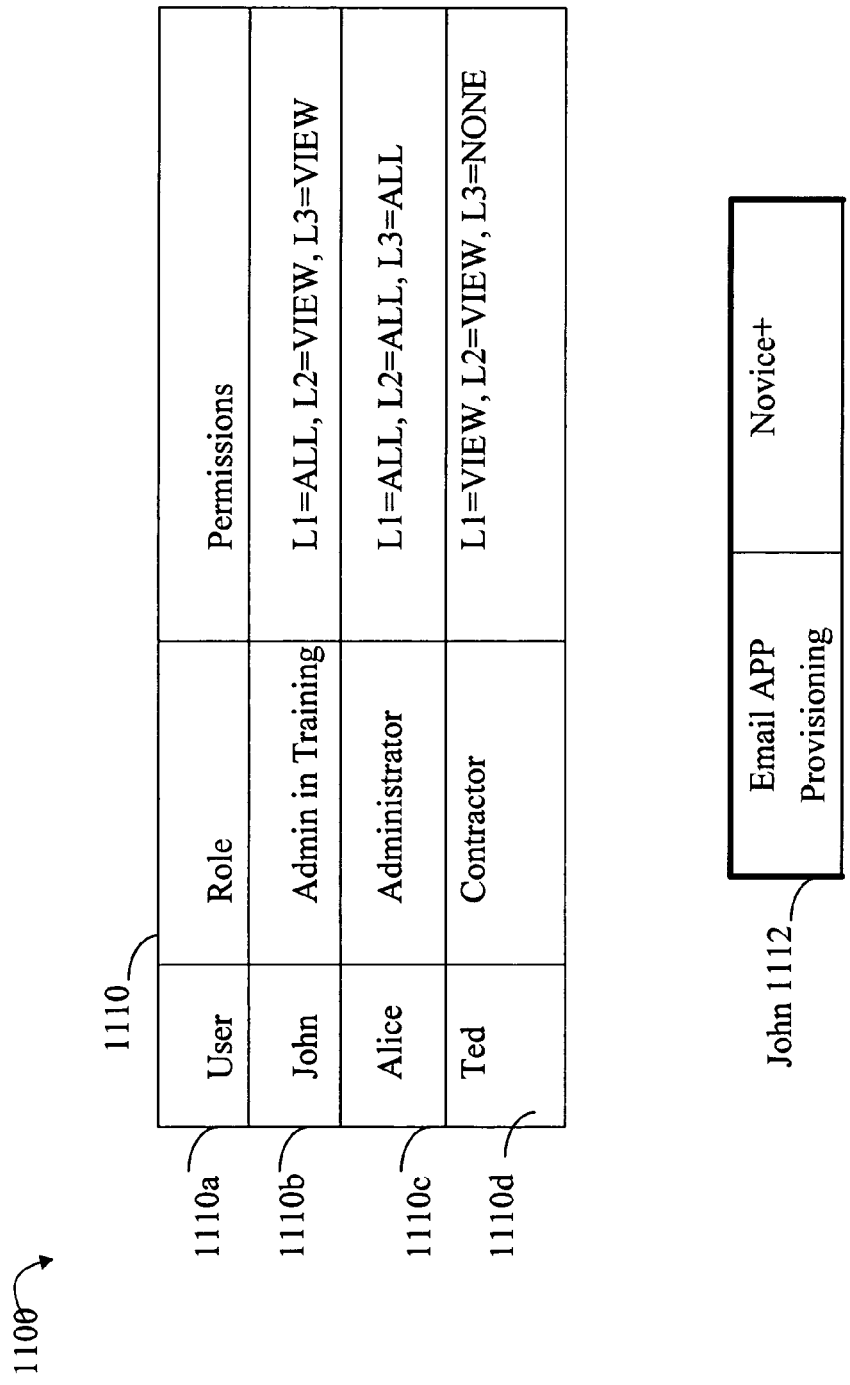
FIG. 14 is an example illustrating use of roles and permissions in an embodiment using the techniques herein.

Referring to FIG. 14, shown is an example 1100 illustrating how a first set of user information indicating UI levels and levels of user interaction may be used in combination with roles and permissions. The example 1100 includes element 1112 which represents entry 810*a* of table 810 from FIG. 9 for user John. Table 1110 includes different roles and permissions that may be specified for different users. Table 1110 includes a row or entry for each user. Element 1110*a* indicates that user John has a role of administrator in training and permissions indicated as follows: L1=ALL, L2=VIEW, L3=VIEW. For purposes of illustration, Ln refers to a particular level number of user interaction and UI level n. Also in this example, novice corresponds to L1, intermediate to L2, and expert to L3. John is allowed to perform all requests from L1 and only allowed to VIEW results from L2 and L3. In other words, John is not allowed to enter any input parameters at L2 and L3, and is not allowed to implement a provisioning request from L2 and L3. John is only allowed to implement a provisioning request and modify parameters at L1. John may input information associated with a request at L1, and then view the additional parameters associated with L2 and L3 as may be automatically determined by code in accordance with best practices. As such, John may learn or gain knowledge, for example, by viewing the parameter values determined for L2 and L3 by the code implementing the best practices for the different requests. Entry 1110*b* indicates that user Alice is an administrator and is able to implement requests from all level L1, L2 and L3. Entry 1110*c* indicates that user Ted is a contractor and is only able to view information at L1 and L2. Ted is not allowed to implement or issue any requests from any level.

It should be noted that although the table 1110 specifies a set of permissions that apply to all UI sets, an embodiment may also specify a set of permissions for each UI set, or one or more UI sets.

In an embodiment using roles and permissions of table 1110 in combination with other user information for user John as indicated by 1112, John is able to view but not modify or otherwise issue provisioning requests from any UI level other than L1, novice. Thus, the information of table 1110 may be used to indicate those requests which are allowable for a particular user.

Described above are some ways in which an embodiment may choose to automatically update a default or starting UI level for a UI set. Such an update may automatically be performed by code that monitors user activity, collects data related to the user activity and performs analysis of the collected data. The foregoing update may be based on, for example, successful completion of a threshold number of requests issued from a particular level, a number of successive user selections, or some combination of the foregoing as well as other criteria that may be specified in an embodiment.

Figure 15:
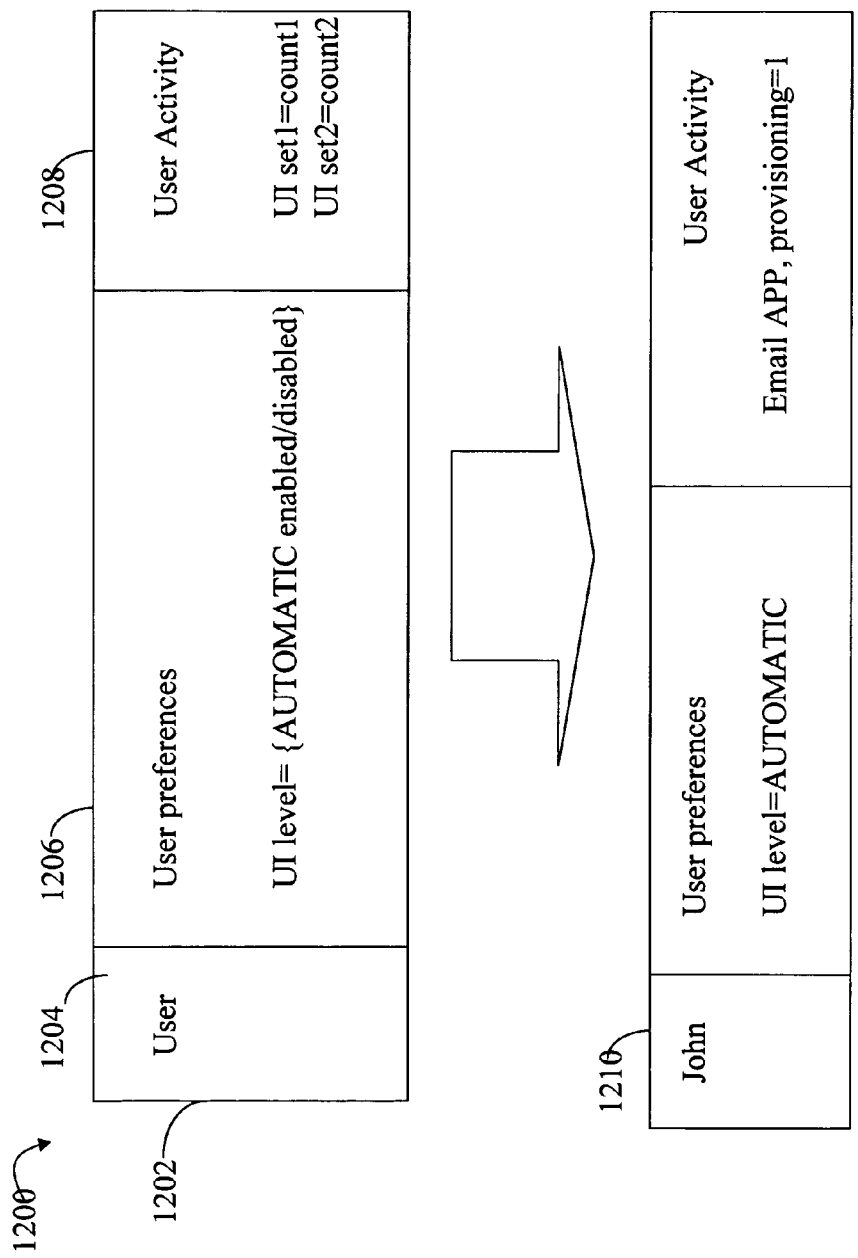
FIG. 15 is an example of user preferences and user activity information that may be used in an embodiment in connection with the techniques herein.

Referring to FIG. 15, shown is an example representation of user preferences and collected information that may be used in automatically adjusting the starting or default UI level for one or more UI sets. The example 1200 includes a table 1202 of information that may be stored for each user indicated by 1204. For each user, user preferences 1206 and user activity information 1208 may be specified. The user preferences 1206 may include preferences specified by the user. In connection with the techniques herein, a user may indicate whether the automatic adjustment of starting or default UI level is enabled/disabled. User activity information 1208 may include one or more counters represented information collected in accordance with observed user activity. Information of 1208 may be further analyzed in connection with determining whether to automatically adjust a starting or default UI level. Information of 1208 may be used if the UI level of 1206 indicates that the foregoing automatic adjustment of starting UI level is enabled. In this example of 1206, there is a single or global indicator which may enable/disable the foregoing automatic adjustment of starting UI level for all UI sets. However, an embodiment may provide for a finer granularity of control by allowing enablement/disablement specification for an individual UI set or groups of UI sets. The particular information collected in 1208 may vary with the criteria used to determine whether to automatically adjust a starting UI level for one or more UI sets. For example, an embodiment may adjust the starting UI level for a UI set depending on whether a threshold number of successful requests have been performed by the user. The criteria for updating the starting UI level may also include that the foregoing requests be made in one or more sessions, within a given time period, and the like. Such information may be collected in 1208 as illustrated. At the start of each user session, information of 1208 may be reinitialized. Other embodiments may use other techniques for data collection and analysis across multiple user sessions.

The information of FIG. 15 may also be stored in a variety of different locations. In one embodiment, the information associated with each user as represented in FIG. 15 may stored in the location associated with element 121 of FIG. 2.

Figure 16:
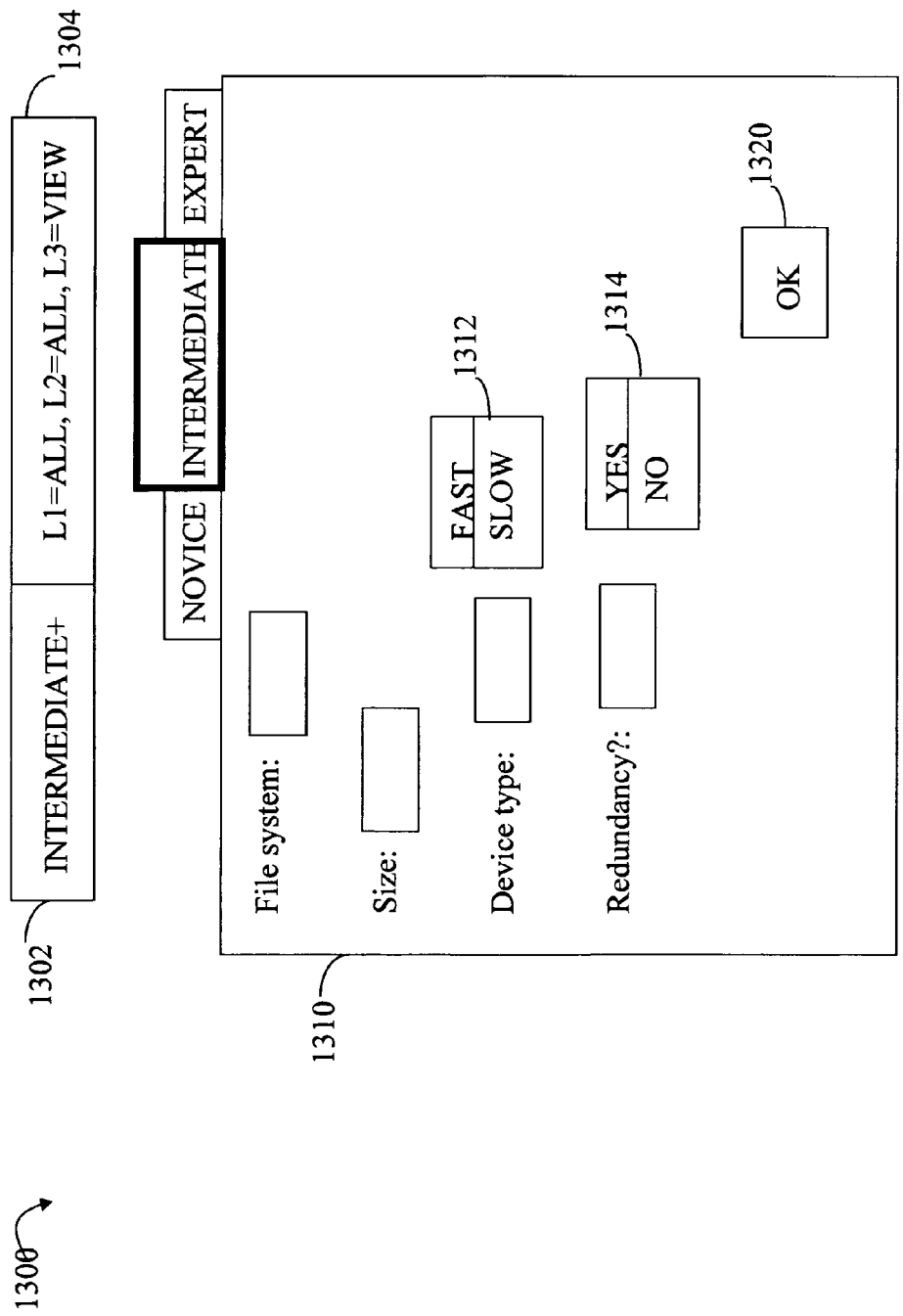
Figure 17:
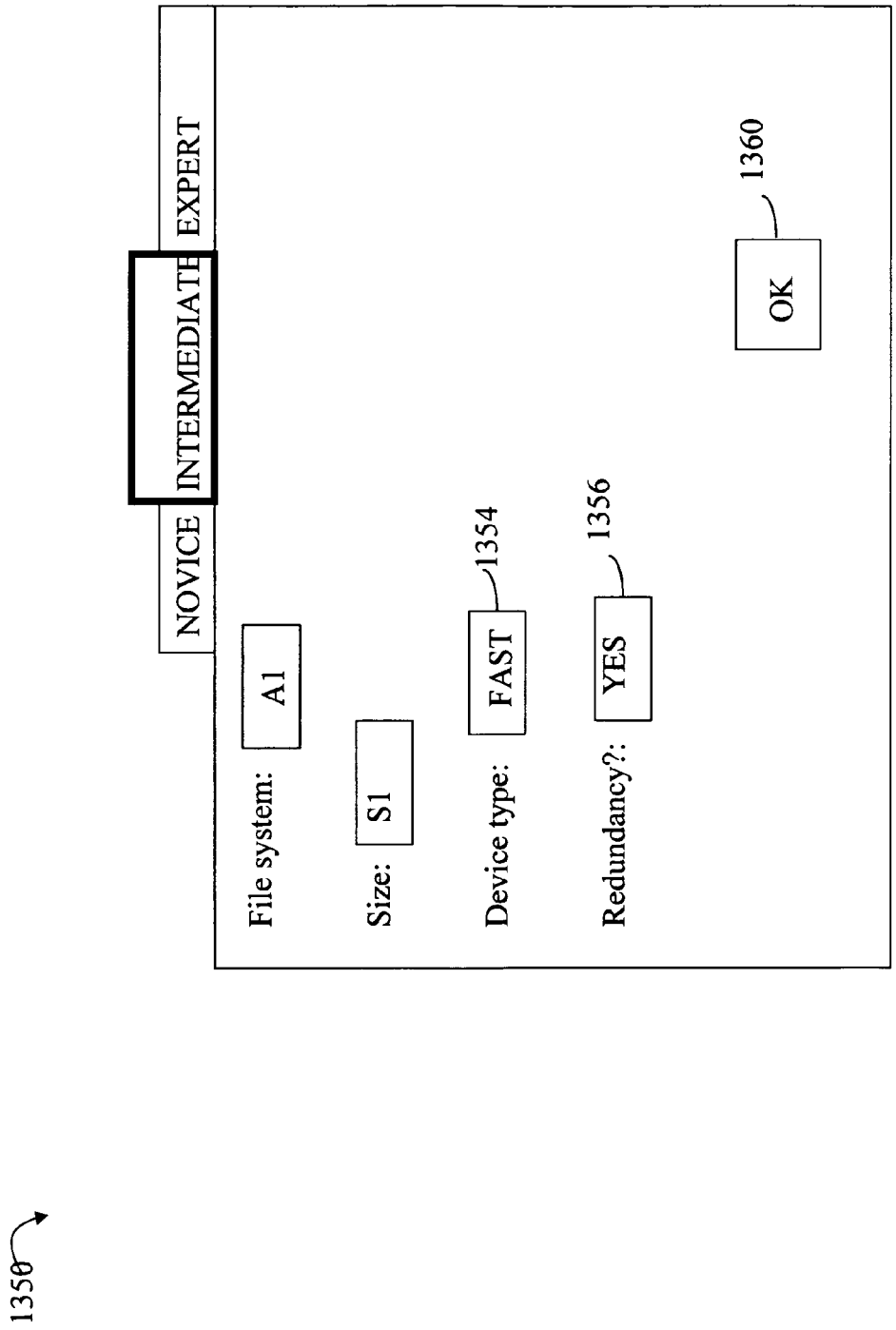
Figure 18:
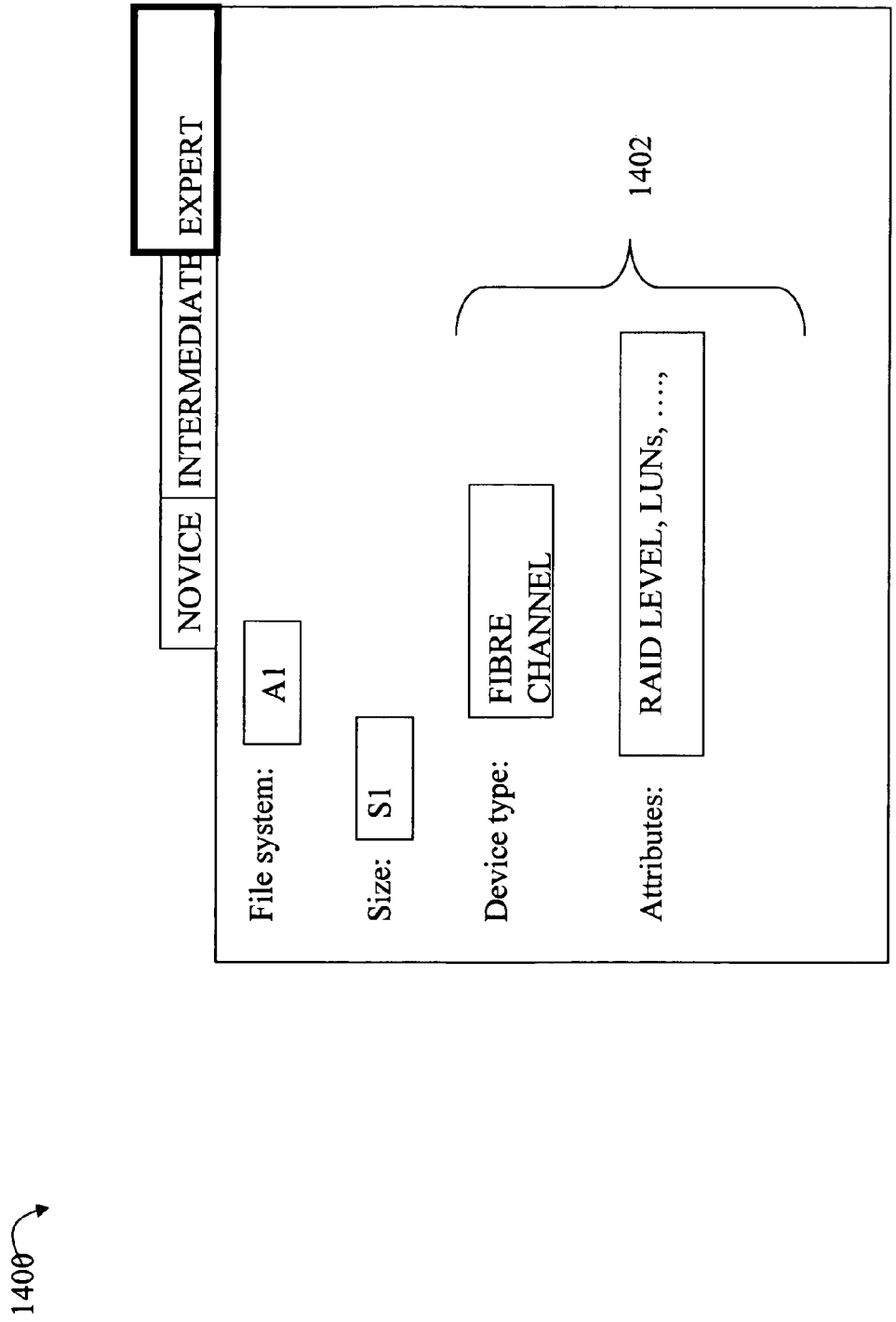

What will now be described in connection with FIGS. 16, 17 and 18 is another example illustrating UIs that may be displayed and used in accordance with the techniques herein described above. Following figures and description make reference to a UI set including 3 UI levels in accordance with FIG. 5. The UI set may include 3 levels: a novice level 1 associated with 402 of FIG. 5, an intermediate level 2 associated with 404 of FIG. 5, and an expert level 3 associated with 406 of FIG. 5.

Referring to FIG. 16, shown is an example of a UI that may be displayed in an embodiment in accordance with the techniques herein. Element 1302 represents information that may be included in an instance of a table of user information 810 of FIG. 9 specifying a starting level of intermediate and a UI extension indicator "+" for the above UI set when issuing a request to provision storage for a file system. Element 1304 may represent permissions allowed for a user. Element 1310 may represent a UI initially displayed for the intermediate level corresponding to element 404 of FIG. 5. Element 1312 may represent a menu that can be displayed by a user in making a selection for device type. Element 1314 may represent a menu that can be displayed by a user in making a selection for redundancy. Selection of the OK button 1320 may result in issuance and implementation of the request in accordance with the information on the display. However, in connection with this example, the user does not select 1320 at this time but rather inputs the requested parameters for file system, size, device type and redundancy.

FIG. 17 may represent the display of FIG. 16 updated with a user's selections and parameter inputs. Subsequently, the user may select the expert tab to view the corresponding data associated with the expert level as may be automatically determined in accordance with best practices. FIG. 18 illustrates the resulting UI display upon selection of the expert tab from FIG. 17. The value of FAST specified in 1354 of FIG. 17 and the input of REDUNDANT=YES (1356 of FIG. 17) are mapped, respectively, in accordance with best practices to the information of 1402. Specification of FAST at the intermediate level illustrated in FIG. 17 causes the system to automatically provision storage from LUNs of one or more Fibre channel devices as indicated by 1402. Specification of REDUNDANT=YES at the intermediate level illustrated in FIG. 17 causes the system to automatically provision storage with some RAID level providing redundancy as indicated in the attributes of 1402.

It should be noted that FIGS. 16 and 17 each include an OK button which the user may select to issue and implement the request. This is in accordance with the permissions of 1304 of FIG. 16. FIG. 18 does not include an OK button in this example since for this particular user, the user is only allowed to view information at the expert level 3. Furthermore, the user may not be able to modify any values displayed in FIG. 18. The information of the UI of FIG. 18 may be read-only in this example. If Element 1304 of FIG. 16 is modified to indicate "L3=ALL", then the display of FIG. 18 may also include an OK button that may be selected to implement the request and the information of the UI of FIG. 18 may also be accordingly modifiable by the user.

In connection with the UI extension indicator as described herein, the examples have illustrated the user selecting to interact at higher levels of expertise or knowledge than the starting level. However, it should be noted that specifying a UI extension indicator may also allow a user to interact at levels characterized as lower than (e.g., associated with levels of greater abstraction) than the starting level as well. For example, referring back to FIGS. 16-18, a starting level of intermediate with the extension indicator "+" in 1302 also allows a user to selectively interact at the novice level as well as the expert level. Specifying a starting level alone without the extension indicator may indicate that the user is only allowed to interact at the starting level. Alternatively, an embodiment may also be implemented so that specifying the starting level without the extension indicator means that the user is allowed to interact at the starting level or other levels of greater abstraction, requiring less knowledge, and the like.

One use of the techniques herein provides for specifying a starting or default UI level for each UI set for a user. The starting UI level may be customized for each UI set for each user. The techniques herein also provide for adjusting or updating the starting UI level for a particular UI set, for example, as a user's proficiency increases. Automatic adjustment to the starting UI level may be performed automatically in accordance with criteria. Processing may be performed to automatically adjust a starting UI level for a UI set in accordance with criteria associated with the particular UI set. The foregoing criteria may be associated with performing operations, selections, tasks, and the like, possibly in connection with a particular application, as may be associated with the UI set.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for user interface selection for a user comprising:
    providing a plurality of user interface sets, wherein each of said plurality of user interface sets includes a plurality of user interfaces corresponding to a plurality of user levels of interaction, each of said plurality of user levels of interaction being associated with a different level of abstraction with respect to processing performed in a data storage system for implementing a request;
    providing first user information associated with the user, the first user information identifying a first of said plurality of user levels for at least one of the plurality of user interface sets;
    selecting, from a first of said plurality of user interface sets, a first user interface for display in connection with interactions with the user in accordance with the first user information;
    displaying a plurality of tabs and the first user interface associated with the first user level for performing a first task for an application, wherein each of the plurality of tabs indicates a different one of the plurality of user levels, the plurality of tabs including at least a first tab denoting the first user level and a second tab denoting a second user level;
    receiving a first set of one or more input parameters through user interaction with the first user interface, wherein the first set of one or more input parameters is used for performing the first task for the application when interacting at the first user level;
    selecting a second one of the plurality of tabs denoting the second user level while the first user interface is displayed and includes the first set of one or more parameters, said second user level indicating a greater level of user proficiency than said first user level, wherein the second tab is selected in response to user selection of the second tab; and
    displaying, in response to performing said selecting the second one of the tabs while the first user interface is displayed and includes the first set of one or more input parameters, a second user interface from the first user interface set for user interactions in connection with performing the first task, wherein said second user interface includes one or more displayed parameters that are automatically determined by mapping the first set of one or more input parameters to said one or more displayed parameters, wherein said one or more displayed parameters are a second set of input parameters customized for performing the first task for the application when interacting at the second user level.

2. The method of claim 1, wherein the one or more displayed parameters indicate performing a data storage provisioning request for the application, and wherein said first of the plurality of user interface sets is associated with performing the data storage provisioning request for the application, and a second different one of the plurality of user interface sets is associated with performing a different type of request for the application.

3. The method of claim 1, wherein the first user interface set includes user interfaces for use in connection with obtaining information of a data storage request, the first user information including a first identifier identifying said first user level and an associated one of the first plurality of user interfaces.

4. The method of claim 3, wherein the first identifier includes a user interface extension indicator indicating that the user may select to interact at one or more other levels included in a range of levels from said first user level to a maximum user level, each of said levels in the range being associated with one of the user interfaces in the first user interface set.

5. The method of claim 4, wherein the associated one of the first plurality of user interfaces is updated in accordance with at least one of a manual selection and an automatic update using one or more criteria.

6. The method of claim 5, wherein the one or more criteria includes successful implementation of a threshold number of requests at a level in the range, and if the threshold number of requests at said level is performed, then said first identifier is updated to identify said level and a corresponding user interface for said level is initially displayed in connection with a subsequent session for said user.

7. A computer-implemented method for user interface selection for a user comprising:
    providing a plurality of user interface sets, wherein each of said plurality of user interface sets includes a plurality of user interfaces corresponding to a plurality of user levels of interaction, each of said plurality of user levels of interaction being associated with a different level of abstraction with respect to processing performed in a data storage system for implementing a request;
    providing a table of first user information associated with the user, the first user information including a starting level identifier for each of said plurality of user interface sets, said starting level identifier including a first identifier identifying one of the user interfaces from said each user interface set and an optional extension indicator wherein, if said optional extension indicator is included in said starting level identifier, said optional extension indicator indicates that the user may select to interact at a different user level and associated user interface than as indicated by the first identifier;
    selecting, from the plurality of user interface sets, a selected user interface set for obtaining information used to implement a request for a task associated with said selected user interface set;
    selecting, in accordance with the selected user interface set, an entry in the table;
    selecting, from the selected user interface set, a first user interface in accordance with the first identifier included in the entry for the selected user interface set;
    displaying a plurality of tabs and the first user interface associated with a first of said plurality of user levels of interaction for performing the task for an application, wherein each of the plurality of tabs indicates a different one of the plurality of user levels, the plurality of tabs including at least a first tab denoting the first user level and a second tab denoting a second user level;
    receiving a first set of one or more input parameters through user interaction with the first user interface, wherein the first set of one or more input parameters is used for performing the first task for the application when interacting at the first user level;

selecting a second one of the plurality of tabs denoting the second user level while the first user interface is displayed and includes the first set of one or more parameters, said second user level indicating a greater level of user proficiency than said first user level, wherein the second tab is selected in response to user selection of the second tab; and displaying, in response to performing said selecting the second one of the tabs while the first user interface is displayed and includes the first set of one or more input parameters, a second user interface from the first user interface set for user interactions in connection with performing the first task, wherein said second user interface includes one or more displayed parameters that are automatically determined by mapping the first set of one or more input parameters to said one or more displayed parameters, wherein said one or more displayed parameters are a second set of input parameters customized for performing the first task for the application when interacting at the second user level.

8. The method of claim 7, wherein the entry in the table includes said starting level identifier, said starting level identifier including said first identifier and the extension indicator.

9. The method of claim 8, wherein the extension indicator indicates that the user may interact at a selected one of said plurality of user levels ranging from said first user level corresponding to said first identifier and a maximum level, each of said plurality of user levels including a corresponding user interface in the selected user interface set.

10. The method of claim 9, further comprising:
displaying a selectable tab for each of said plurality of user levels ranging from the first user level to the maximum level.

11. The method of claim 10, wherein said first identifier is automatically updated in accordance with data collected for activity of said user.

12. The method of claim 7, wherein at least one of the plurality of user interface sets is associated with performing data storage provisioning for an application storing data on the data storage system.

13. The method of claim 11, wherein updating of the first identifier is performed in accordance with an enablement indicator, wherein when said enablement indicator is enabled, processing is performed to determine whether to update the first identifier in accordance with data collected for activity of the user, and if said enablement indicator is not enabled, said processing is not performed.

14. The method of claim 7, wherein permission information for the user is used to determine whether the user is allowed to modify data displayed in the first user interface and whether the user is allowed to implement a request using the first interface.

15. A non-transitory computer readable medium comprising executable code stored thereon for user interface selection for a user, the non-transitory computer readable medium comprising executable code for:

providing a plurality of user interface sets, wherein each of said plurality of user interface sets includes a plurality of user interfaces corresponding to a plurality of user levels of interaction, each of said plurality of user levels of interaction being associated with a different level of abstraction with respect to processing performed in a data storage system for implementing a request;

providing a table of first user information associated with the user, the first user information including a starting level identifier for each of said plurality of user interface sets, said starting level identifier including a first identifier identifying one of the user interfaces from said each user interface set and an optional extension indicator wherein, if said optional extension indicator is included in said starting level identifier, said optional extension indicator indicates that the user may select to interact at a different user level and associated user interface than as indicated by the first identifier;

selecting, from the plurality of user interface sets, a selected user interface set for obtaining information used to implement a request for a task associated with said selected user interface set;

selecting, in accordance with the selected user interface set, an entry in the table;

selecting, from the selected user interface set, a first user interface in accordance with the first identifier included in the entry" for the selected user interface set;

displaying a plurality of tabs and the first user interface associated with a first of said plurality of user levels of interaction for performing the task for an application, wherein each of the plurality of tabs indicates a different one of the plurality of user levels, the plurality of tabs including at least a first tab denoting the first user level and a second tab denoting a second user level;

receiving a first set of one or more input parameters through user interaction with the first user interface, wherein the first set of one or more input parameters is used for performing the first task for the application when interacting at the first user level;

selecting a second one of the plurality of tabs denoting the second user level while the first user interface is displayed and includes the first set of one or more parameters, said second user level indicating a greater level of user proficiency than said first user level, wherein the second tab is selected in response to user selection of the second tab; and displaying, in response to performing said selecting the second one of the tabs while the first user interface is displayed and includes the first set of one or more input parameters, a second user interface from the first user interface set for user interactions in connection with performing the first task, wherein said second user interface includes one or more displayed parameters that are automatically determined by mapping the first set of one or more input parameters to said one or more displayed parameters, wherein said one or more displayed parameters are a second set of input parameters customized for performing the first task for the application when interacting at the second user level.

16. The non-transitory computer readable medium of claim 15, wherein the entry in the table includes said starting level identifier, said starting level identifier including said first identifier and the extension indicator, wherein the extension indicator indicates that the user may interact at a selected one of said plurality of user levels ranging from said first user level corresponding to said first identifier and a maximum level, each of said plurality of user levels including a corresponding user interface in the selected user interface set.

17. The non-transitory computer readable medium of claim 16, further comprising executable code for:
displaying a selectable tab for each of said plurality of user levels ranging from the first user level to the maximum level.

18. The non-transitory computer readable medium of claim 17, wherein said first identifier is automatically updated in accordance with data collected for activity of said user, and wherein updating of the first identifier is performed in accordance with an enablement indicator, when said enablement indicator is enabled, processing is performed to determine whether to update the first identifier in accordance with data collected for activity of the user, and if said enablement indicator is not enabled, said processing is not performed.

19. The non-transitory computer readable medium of claim 15, wherein at least one of the plurality of user interface sets is associated with performing data storage provisioning for an application storing data on the data storage system.

* * * * *